United States Patent
Duluk, Jr. et al.

(10) Patent No.: US 11,307,903 B2
(45) Date of Patent: Apr. 19, 2022

(54) DYNAMIC PARTITIONING OF EXECUTION RESOURCES

(71) Applicant: NVIDIA Corporation, Santa Clara, CA (US)

(72) Inventors: Jerome F. Duluk, Jr., Palo Alto, CA (US); Luke Durant, San Jose, CA (US); Ramon Matas Navarro, Newburyport, MA (US); Alan Menezes, San Jose, CA (US); Jeffrey Tuckey, Saratoga, CA (US); Gentaro Hirota, San Jose, CA (US); Brian Pharris, Cary, NC (US)

(73) Assignee: NVIDIA Corporation, Santa Clara, CA (US)

( * ) Notice: Subject to any disclaimer, the term of this patent is extended or adjusted under 35 U.S.C. 154(b) by 537 days.

(21) Appl. No.: 15/885,751

(22) Filed: Jan. 31, 2018

(65) Prior Publication Data
US 2019/0235928 A1 Aug. 1, 2019

(51) Int. Cl.
*G06F 9/50* (2006.01)
*G06F 9/48* (2006.01)
*G06F 9/455* (2018.01)

(52) U.S. Cl.
CPC .......... *G06F 9/5061* (2013.01); *G06F 9/4881* (2013.01); *G06F 9/505* (2013.01); *G06F 9/5072* (2013.01); *G06F 9/45558* (2013.01); *G06F 2209/5018* (2013.01)

(58) Field of Classification Search
CPC ...... G06F 9/5061; G06F 9/4881; G06F 9/505; G06F 9/5072; G06F 9/45558; G06F 2209/5018
See application file for complete search history.

(56) References Cited

U.S. PATENT DOCUMENTS

| | | | |
|---|---|---|---|
| 4,748,558 A | 5/1988 | Hirosawa et al. | |
| 9,864,636 B1* | 1/2018 | Patel | G06F 9/45533 |
| 10,310,973 B2* | 6/2019 | Barrow-Williams | G06F 12/08 |
| 2005/0210472 A1 | 9/2005 | Accapadi et al. | |
| 2007/0050580 A1 | 3/2007 | Lewis | |

(Continued)

OTHER PUBLICATIONS

Non-Final Office Action for U.S. Appl. No. 15/885,761, dated May 28, 2019, 16 pages.

*Primary Examiner* — Lewis A Bullock, Jr.
*Assistant Examiner* — Kevin X Lu
(74) *Attorney, Agent, or Firm* — Artegis Law Group, LLP

(57) ABSTRACT

Embodiments of the present invention set forth techniques for allocating execution resources to groups of threads within a graphics processing unit. A compute work distributor included in the graphics processing unit receives an indication from a process that a first group of threads is to be launched. The compute work distributor determines that a first subcontext associated with the process has at least one processor credit. In some embodiments, CTAs may be launched even when there are no processor credits, if one of the TPCs that was already acquired has sufficient space. The compute work distributor identifies a first processor included in a plurality of processors that has a processing load that is less than or equal to the processor loads associated with all other processors included in the plurality of processors. The compute work distributor launches the first group of threads to execute on the first processor.

20 Claims, 15 Drawing Sheets

(56) References Cited

U.S. PATENT DOCUMENTS

| | | | |
|---|---|---|---|
| 2008/0250422 A1* | 10/2008 | Lewis | G06F 9/4881 |
| | | | 718/107 |
| 2011/0055511 A1 | 3/2011 | Mantor et al. | |
| 2011/0072244 A1* | 3/2011 | Lindholm | G06F 9/3851 |
| | | | 712/214 |
| 2011/0191627 A1* | 8/2011 | Koning | G06F 11/00 |
| | | | 714/5.1 |
| 2012/0110586 A1* | 5/2012 | Coon | G06F 9/4881 |
| | | | 718/102 |
| 2012/0266015 A1* | 10/2012 | Taylor | H04L 12/5601 |
| | | | 714/4.11 |
| 2014/0019989 A1 | 1/2014 | Suzuki et al. | |
| 2015/0186184 A1* | 7/2015 | Kim | G06F 9/5088 |
| | | | 718/104 |
| 2015/0324234 A1* | 11/2015 | Chang | G06F 9/5033 |
| | | | 718/104 |
| 2017/0031719 A1* | 2/2017 | Clark | G06F 9/5016 |
| 2017/0270051 A1 | 9/2017 | Chen et al. | |
| 2017/0286168 A1* | 10/2017 | Simpson | G06F 9/505 |
| 2018/0107514 A1* | 4/2018 | Dice | G06F 9/5022 |
| 2018/0131583 A1* | 5/2018 | Barrows | H04L 67/306 |
| 2020/0004993 A1* | 1/2020 | Volos | G06F 21/805 |

\* cited by examiner

TPC Enable Table 500

| 510 \ 520 | TPC 0 | TPC 1 | TPC 2 | TPC 3 | TPC 4 | TPC 5 | TPC 6 | TPC 7 | TPC 8 | TPC 9 | TPC 10 | TPC 11 | TPC 12 | TPC 13 |
|---|---|---|---|---|---|---|---|---|---|---|---|---|---|---|
| Subcontext 0 | 1 | 1 | 1 | 1 | 1 | 1 | 1 | 1 | 1 | 1 | 1 | 1 | 1 | 1 |
| Subcontext 1 | 1 | 1 | 1 | 1 | 1 | 1 | 1 | 1 | 1 | 1 | 1 | 1 | 1 | 1 |
| Subcontext 2 | 1 | 1 | 1 | 1 | 1 | 1 | 1 | 1 | 1 | 1 | 1 | 1 | 1 | 1 |
| Subcontext 3 | 1 | 1 | 1 | 1 | 1 | 1 | 1 | 1 | 1 | 1 | 1 | 1 | 1 | 1 |
| Subcontext 4 | 1 | 1 | 1 | 1 | 1 | 1 | 1 | 1 | 1 | 1 | 1 | 1 | 1 | 1 |
| Subcontext 5 | 1 | 1 | 1 | 1 | 1 | 1 | 1 | 1 | 1 | 1 | 1 | 1 | 1 | 1 |
| Subcontext 6 | 1 | 1 | 1 | 1 | 1 | 1 | 1 | 1 | 1 | 1 | 1 | 1 | 1 | 1 |
| Subcontext 7 | 1 | 1 | 1 | 1 | 1 | 1 | 1 | 1 | 1 | 1 | 1 | 1 | 1 | 1 |
| Subcontext 8 | 1 | 1 | 1 | 1 | 1 | 1 | 1 | 1 | 1 | 1 | 1 | 1 | 1 | 1 |
| Subcontext 9 | 1 | 1 | 1 | 1 | 1 | 1 | 1 | 1 | 1 | 1 | 1 | 1 | 1 | 1 |
| Subcontext 10 | 1 | 1 | 1 | 1 | 1 | 1 | 1 | 1 | 1 | 1 | 1 | 1 | 1 | 1 |
| Subcontext 11 | 1 | 1 | 1 | 1 | 1 | 1 | 1 | 1 | 1 | 1 | 1 | 1 | 1 | 1 |
| Subcontext 12 | 1 | 1 | 1 | 1 | 1 | 1 | 1 | 1 | 1 | 1 | 1 | 1 | 1 | 1 |
| Subcontext 13 | 1 | 1 | 1 | 1 | 1 | 1 | 1 | 1 | 1 | 1 | 1 | 1 | 1 | 1 |
| Subcontext 14 | 1 | 1 | 1 | 1 | 1 | 1 | 1 | 1 | 1 | 1 | 1 | 1 | 1 | 1 |
| Subcontext 15 | 1 | 1 | 1 | 1 | 1 | 1 | 1 | 1 | 1 | 1 | 1 | 1 | 1 | 1 |

Figure 5A

LMEM Block Index Table 550

| 560 / 570 | TPC 0 | TPC 1 | TPC 2 | TPC 3 | TPC 4 | TPC 5 | TPC 6 | TPC 7 | TPC 8 | TPC 9 | TPC 10 | TPC 11 | TPC 12 | TPC 13 |
|---|---|---|---|---|---|---|---|---|---|---|---|---|---|---|
| Subcontext 0 | 0 | 1 | 2 | 3 | 4 | 5 | 6 | 7 | 8 | 9 | 10 | 11 | 12 | 13 |
| Subcontext 1 | 0 | 1 | 2 | 3 | 4 | 5 | 6 | 7 | 8 | 9 | 10 | 11 | 12 | 13 |
| Subcontext 2 | 0 | 1 | 2 | 3 | 4 | 5 | 6 | 7 | 8 | 9 | 10 | 11 | 12 | 13 |
| Subcontext 3 | 0 | 1 | 2 | 3 | 4 | 5 | 6 | 7 | 8 | 9 | 10 | 11 | 12 | 13 |
| Subcontext 4 | 0 | 1 | 2 | 3 | 4 | 5 | 6 | 7 | 8 | 9 | 10 | 11 | 12 | 13 |
| Subcontext 5 | 0 | 1 | 2 | 3 | 4 | 5 | 6 | 7 | 8 | 9 | 10 | 11 | 12 | 13 |
| Subcontext 6 | 0 | 1 | 2 | 3 | 4 | 5 | 6 | 7 | 8 | 9 | 10 | 11 | 12 | 13 |
| Subcontext 7 | 0 | 1 | 2 | 3 | 4 | 5 | 6 | 7 | 8 | 9 | 10 | 11 | 12 | 13 |
| Subcontext 8 | 0 | 1 | 2 | 3 | 4 | 5 | 6 | 7 | 8 | 9 | 10 | 11 | 12 | 13 |
| Subcontext 9 | 0 | 1 | 2 | 3 | 4 | 5 | 6 | 7 | 8 | 9 | 10 | 11 | 12 | 13 |
| Subcontext 10 | 0 | 1 | 2 | 3 | 4 | 5 | 6 | 7 | 8 | 9 | 10 | 11 | 12 | 13 |
| Subcontext 11 | 0 | 1 | 2 | 3 | 4 | 5 | 6 | 7 | 8 | 9 | 10 | 11 | 12 | 13 |
| Subcontext 12 | 0 | 1 | 2 | 3 | 4 | 5 | 6 | 7 | 8 | 9 | 10 | 11 | 12 | 13 |
| Subcontext 13 | 0 | 1 | 2 | 3 | 4 | 5 | 6 | 7 | 8 | 9 | 10 | 11 | 12 | 13 |
| Subcontext 14 | 0 | 1 | 2 | 3 | 4 | 5 | 6 | 7 | 8 | 9 | 10 | 11 | 12 | 13 |
| Subcontext 15 | 0 | 1 | 2 | 3 | 4 | 5 | 6 | 7 | 8 | 9 | 10 | 11 | 12 | 13 |

Figure 5B

TPC Enable Table 600

| | TPC 0 | TPC 1 | TPC 2 | TPC 3 | TPC 4 | TPC 5 | TPC 6 | TPC 7 | TPC 8 | TPC 9 | TPC 10 | TPC 11 | TPC 12 | TPC 13 |
|---|---|---|---|---|---|---|---|---|---|---|---|---|---|---|
| Subcontext 0 | 1 | 1 | 0 | 0 | 0 | 0 | 0 | 0 | 0 | 0 | 0 | 0 | 0 | 0 |
| Subcontext 1 | 0 | 1 | 1 | 0 | 0 | 0 | 0 | 0 | 0 | 0 | 0 | 0 | 0 | 0 |
| Subcontext 2 | 0 | 0 | 1 | 1 | 0 | 0 | 0 | 0 | 0 | 0 | 0 | 0 | 0 | 0 |
| Subcontext 3 | 0 | 0 | 0 | 1 | 1 | 0 | 0 | 0 | 0 | 0 | 0 | 0 | 0 | 0 |
| Subcontext 4 | 0 | 0 | 0 | 0 | 1 | 1 | 0 | 0 | 0 | 0 | 0 | 0 | 0 | 0 |
| Subcontext 5 | 0 | 0 | 0 | 0 | 0 | 1 | 1 | 0 | 0 | 0 | 0 | 0 | 0 | 0 |
| Subcontext 6 | 0 | 0 | 0 | 0 | 0 | 0 | 1 | 1 | 0 | 0 | 0 | 0 | 0 | 0 |
| Subcontext 7 | 0 | 0 | 0 | 0 | 0 | 0 | 0 | 1 | 1 | 0 | 0 | 0 | 0 | 0 |
| Subcontext 8 | 0 | 0 | 0 | 0 | 0 | 0 | 0 | 0 | 1 | 1 | 0 | 0 | 0 | 0 |
| Subcontext 9 | 0 | 0 | 0 | 0 | 0 | 0 | 0 | 0 | 0 | 1 | 1 | 0 | 0 | 0 |
| Subcontext 10 | 0 | 0 | 0 | 0 | 0 | 0 | 0 | 0 | 0 | 0 | 1 | 1 | 0 | 0 |
| Subcontext 11 | 0 | 0 | 0 | 0 | 0 | 0 | 0 | 0 | 0 | 0 | 0 | 1 | 1 | 0 |
| Subcontext 12 | 0 | 0 | 0 | 0 | 0 | 0 | 0 | 0 | 0 | 0 | 0 | 0 | 1 | 1 |
| Subcontext 13 | 0 | 0 | 0 | 0 | 0 | 0 | 0 | 0 | 0 | 0 | 0 | 0 | 0 | 1 |
| Subcontext 14 | 1 | 0 | 0 | 0 | 0 | 0 | 0 | 0 | 0 | 0 | 0 | 0 | 0 | 0 |
| Subcontext 15 | 1 | 1 | 0 | 0 | 0 | 0 | 0 | 0 | 0 | 0 | 0 | 0 | 0 | 0 |

Figure 6A

LMEM Block Index Table 650

| | TPC 0 | TPC 1 | TPC 2 | TPC 3 | TPC 4 | TPC 5 | TPC 6 | TPC 7 | TPC 8 | TPC 9 | TPC 10 | TPC 11 | TPC 12 | TPC 13 |
|---|---|---|---|---|---|---|---|---|---|---|---|---|---|---|
| Subcontext 0 | 0 | 1 | X | X | X | X | X | X | X | X | X | X | X | X |
| Subcontext 1 | X | 0 | 1 | X | X | X | X | X | X | X | X | X | X | X |
| Subcontext 2 | X | X | 0 | 1 | X | X | X | X | X | X | X | X | X | X |
| Subcontext 3 | X | X | X | 0 | 1 | X | X | X | X | X | X | X | X | X |
| Subcontext 4 | X | X | X | X | 0 | 1 | X | X | X | X | X | X | X | X |
| Subcontext 5 | X | X | X | X | X | 0 | 1 | X | X | X | X | X | X | X |
| Subcontext 6 | X | X | X | X | X | X | 0 | 1 | X | X | X | X | X | X |
| Subcontext 7 | X | X | X | X | X | X | X | 0 | 1 | X | X | X | X | X |
| Subcontext 8 | X | X | X | X | X | X | X | X | 0 | 1 | X | X | X | X |
| Subcontext 9 | X | X | X | X | X | X | X | X | X | 0 | 1 | X | X | X |
| Subcontext 10 | X | X | X | X | X | X | X | X | X | X | 0 | 1 | X | X |
| Subcontext 11 | X | X | X | X | X | X | X | X | X | X | X | 0 | 1 | X |
| Subcontext 12 | X | X | X | X | X | X | X | X | X | X | X | X | 0 | 1 |
| Subcontext 13 | X | X | X | X | X | X | X | X | X | X | X | X | X | 0 |
| Subcontext 14 | 1 | X | X | X | X | X | X | X | X | X | X | X | X | X |
| Subcontext 15 | X | X | X | X | X | X | X | X | X | X | X | X | X | X |

Figure 6B

TPC Enable Table 700

| 710 / 720 | TPC 0 | TPC 1 | TPC 2 | TPC 3 | TPC 4 | TPC 5 | TPC 6 | TPC 7 | TPC 8 | TPC 9 | TPC 10 | TPC 11 | TPC 12 | TPC 13 |
|---|---|---|---|---|---|---|---|---|---|---|---|---|---|---|
| Subcontext 0 | 1 | 1 | 1 | 1 | 1 | 1 | 1 | 1 | 1 | 1 | 1 | 1 | 1 | 1 |
| Subcontext 1 | 1 | 1 | 1 | 1 | 1 | 1 | 1 | 1 | 1 | 1 | 1 | 1 | 1 | 1 |
| Subcontext 2 | 1 | 1 | 1 | 1 | 1 | 1 | 1 | 1 | 1 | 1 | 1 | 1 | 1 | 1 |
| Subcontext 3 | 1 | 1 | 1 | 1 | 1 | 1 | 1 | 1 | 1 | 1 | 1 | 1 | 1 | 1 |
| Subcontext 4 | 1 | 1 | 1 | 1 | 1 | 1 | 1 | 1 | 1 | 1 | 1 | 1 | 1 | 1 |
| Subcontext 5 | 1 | 1 | 1 | 1 | 1 | 1 | 1 | 1 | 1 | 1 | 1 | 1 | 1 | 1 |
| Subcontext 6 | 1 | 1 | 1 | 1 | 1 | 1 | 1 | 1 | 1 | 1 | 1 | 1 | 1 | 1 |
| Subcontext 7 | 1 | 1 | 1 | 1 | 1 | 1 | 1 | 1 | 1 | 1 | 1 | 1 | 1 | 1 |
| Subcontext 8 | 1 | 1 | 1 | 1 | 1 | 1 | 1 | 1 | 1 | 1 | 1 | 1 | 1 | 1 |
| Subcontext 9 | 1 | 1 | 1 | 1 | 1 | 1 | 1 | 1 | 1 | 1 | 1 | 1 | 1 | 1 |
| Subcontext 10 | 1 | 1 | 1 | 1 | 1 | 1 | 1 | 1 | 1 | 1 | 1 | 1 | 1 | 1 |
| Subcontext 11 | 1 | 1 | 1 | 1 | 1 | 1 | 1 | 1 | 1 | 1 | 1 | 1 | 1 | 1 |
| Subcontext 12 | 1 | 1 | 1 | 1 | 1 | 1 | 1 | 1 | 1 | 1 | 1 | 1 | 1 | 1 |
| Subcontext 13 | 1 | 1 | 1 | 1 | 1 | 1 | 1 | 1 | 1 | 1 | 1 | 1 | 1 | 1 |
| Subcontext 14 | 1 | 1 | 1 | 1 | 1 | 1 | 1 | 1 | 1 | 1 | 1 | 1 | 1 | 1 |
| Subcontext 15 | 1 | 1 | 1 | 1 | 1 | 1 | 1 | 1 | 1 | 1 | 1 | 1 | 1 | 1 |

Figure 7

TPC Enable Table 800

| | TPC 0 | TPC 1 | TPC 2 | TPC 3 | TPC 4 | TPC 5 | TPC 6 | TPC 7 | TPC 8 | TPC 9 | TPC 10 | TPC 11 | TPC 12 | TPC 13 |
|---|---|---|---|---|---|---|---|---|---|---|---|---|---|---|
| Subcontext 0 | 1 | 1 | 1 | 1 | 1 | 1 | 1 | 0 | 0 | 0 | 0 | 0 | 0 | 0 |
| Subcontext 1 | 1 | 1 | 1 | 1 | 1 | 1 | 1 | 0 | 0 | 0 | 0 | 0 | 0 | 0 |
| Subcontext 2 | 1 | 1 | 1 | 1 | 1 | 1 | 1 | 0 | 0 | 0 | 0 | 0 | 0 | 0 |
| Subcontext 3 | 1 | 1 | 1 | 1 | 1 | 1 | 1 | 0 | 0 | 0 | 0 | 0 | 0 | 0 |
| Subcontext 4 | 1 | 1 | 1 | 1 | 1 | 1 | 1 | 0 | 0 | 0 | 0 | 0 | 0 | 0 |
| Subcontext 5 | 1 | 1 | 1 | 1 | 1 | 1 | 1 | 0 | 0 | 0 | 0 | 0 | 0 | 0 |
| Subcontext 6 | 1 | 1 | 1 | 1 | 1 | 1 | 1 | 0 | 0 | 0 | 0 | 0 | 0 | 0 |
| Subcontext 7 | 1 | 1 | 1 | 1 | 1 | 1 | 1 | 0 | 0 | 0 | 0 | 0 | 0 | 0 |
| Subcontext 8 | 0 | 0 | 0 | 0 | 0 | 0 | 0 | 1 | 1 | 1 | 1 | 1 | 1 | 1 |
| Subcontext 9 | 0 | 0 | 0 | 0 | 0 | 0 | 0 | 1 | 1 | 1 | 1 | 1 | 1 | 1 |
| Subcontext 10 | 0 | 0 | 0 | 0 | 0 | 0 | 0 | 1 | 1 | 1 | 1 | 1 | 1 | 1 |
| Subcontext 11 | 0 | 0 | 0 | 0 | 0 | 0 | 0 | 1 | 1 | 1 | 1 | 1 | 1 | 1 |
| Subcontext 12 | 0 | 0 | 0 | 0 | 0 | 0 | 0 | 1 | 1 | 1 | 1 | 1 | 1 | 1 |
| Subcontext 13 | 0 | 0 | 0 | 0 | 0 | 0 | 0 | 1 | 1 | 1 | 1 | 1 | 1 | 1 |
| Subcontext 14 | 0 | 0 | 0 | 0 | 0 | 0 | 0 | 1 | 1 | 1 | 1 | 1 | 1 | 1 |
| Subcontext 15 | 0 | 0 | 0 | 0 | 0 | 0 | 0 | 1 | 1 | 1 | 1 | 1 | 1 | 1 |

Figure 8

DYNAMIC PARTITIONING OF EXECUTION RESOURCES

BACKGROUND OF THE INVENTION

Field of the Invention

Embodiments of the present invention relate generally to computer processing and, more specifically, to dynamic partitioning of execution resources.

Description of the Related Art

Modern graphics processing units (GPUs) are typically configured to execute large numbers of threads in parallel. In so doing, a GPU is normally restricted to operate within one context at time, where all threads execute within that same context. This restriction implies, among other things, that every thread executing at a particular time shares the same GPU state and the same virtual address space. Such an operating model works well for a process that exhibits large amounts of parallelism, where the process can utilize a significant percentage of the available processing resources of the GPU. However, many application programs execute multiple processes, where each process only expresses enough parallelism to utilize a small percentage of the available processing resources of the GPU, and each process requires different GPU state and a different virtual address space. Accordingly, application programs that execute multiple processes oftentimes run inefficiently on GPUs.

To solve this problem, some GPU execution models operate within a single context, where that context has multiple subcontexts, and each subcontext is assigned to a different process. In such an approach, all of the subcontexts operate within the same context, but each subcontext has a different GPU state and a different virtual address space. In one particular implementation, each subcontext is statically assigned to one or more specific texture processing clusters (TPCs), where each TPC includes two or more streaming multiprocessors (SMs), thereby enabling each TPC to concurrently execute a specified number of threads. Further, the subset of each subcontext's virtual address space that is reserved to be used as local thread memory is statically assigned for each TPC that the subcontext is permitted to use.

One drawback of the above implementation is that the assignments of TPCs and memory spaces to the different subcontexts associated with the different processes is static, which restricts the system's ability to load balance across the different TPCs and memory resources. Among other things, the different processes associated with the different subcontexts may need different amounts of processing and memory resources. Further, the processing and memory requirements for a particular process can change over time. But, because the TPCs allocated and memory assigned to the different subcontexts are static, those resources cannot be increased or decreased as conditions or requirements change. For example, a process executing in a subcontext assigned to a set of heavily loaded TPCs could launch a new cooperative thread array (CTA). However, the new CTA would only be able to launch on the set of the heavily loaded TPCs because those TPCs are the ones allocated to that process, even if other TPCs allocated to other processes are more lightly loaded or idle. Thus, static partitioning of resources to different subcontexts also can result in inefficient GPU resource allocation and execution.

As the foregoing illustrates, what is needed in the art are more effective techniques for allocating execution resources within a processor.

SUMMARY OF THE INVENTION

Embodiments of the present invention set forth a computer-implemented method for allocating execution resources to groups of threads within a graphics processing unit. The method includes receiving an indication from a process that a first group of threads is to be launched. The method further includes determining that a first subcontext associated with the process has at least one processor credit. The method further includes identifying a first processor included in a plurality of processors that has a processing load that is less than or equal to the processor loads associated with all other processors included in the plurality of processors. The method further includes launching the first group of threads to execute on the first processor.

Embodiments of the present invention set forth a computer-implemented method for assigning local memory to thread groups within a graphics processing unit. The method includes receiving an indication that a first thread group associated with a first subcontext has been assigned to execute on a first processor. The method further includes identifying a first record in a local memory block assignment table corresponding to the first subcontext. The method further includes identifying a first local memory block that is currently not assigned. The method further includes storing a first value in the first record indicating that the first local memory block is assigned to the first subcontext and the first processor.

Other embodiments of the present invention include, without limitation, a parallel processing subsystem for performing one or more aspects of the disclosed techniques, as well as a system for performing one or more aspects of the disclosed techniques.

At least one advantage of the disclosed techniques is that execution and local memory resources are flexibly and efficiently assigned to subcontexts corresponding to multiple processes within a parallel processing system. As a result, the utilization of the execution and local memory resources is increased relative to prior approaches. Another advantage of the disclosed techniques is that the maximum amount of execution and local memory resources that can be allocated or assigned to one subcontext is selectable and can be limited to allow more subcontexts to execute simultaneously, within the constraints of the number of available TPCs and local memory blocks. Yet another advantage of the disclosed techniques is that that all subcontexts execute within a single context, but maintain separate virtual address spaces and separate state data. As a result, TPCs can quickly switch from executing a CTA for one subcontext to executing a CTA for another different subcontext without the need for a full context switch.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A-5B illustrate a TPC enable table and an LMEM block index table for static TPC partitioning, according to various embodiments of the present invention;

FIGS. 6A-6B illustrate a TPC enable table and an LMEM block index table for static TPC partitioning, according to other various embodiments of the present invention;

FIG. 7 illustrates a TPC enable table 800 for dynamic TPC partitioning, according to various embodiments of the present invention;

FIG. 8 illustrates a TPC enable table 800 for dynamic TPC partitioning, according to other various embodiments of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
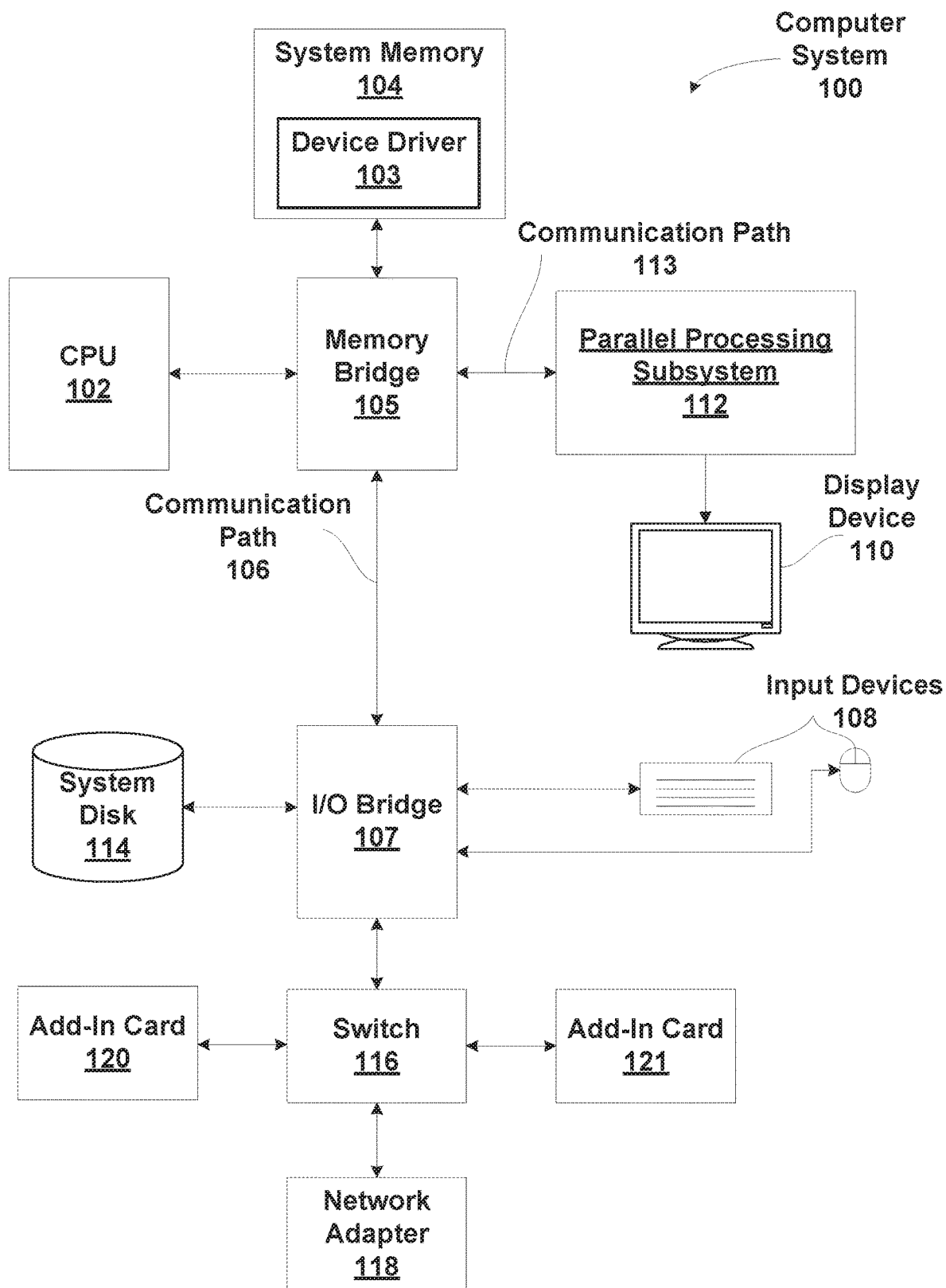
FIG. 1 is a block diagram illustrating a computer system configured to implement one or more aspects of the present invention.

FIG. 1 is a block diagram illustrating a computer system 100 configured to implement one or more aspects of the present invention. In some embodiments, computer system 100 is a server machine operating in a data center or a cloud computing environment that provides scalable computing resources as a service over a network. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIGS. 2 and 3, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In operation, CPU 102 is the master processor of computer system 100, controlling and coordinating operations of other system components. In particular, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
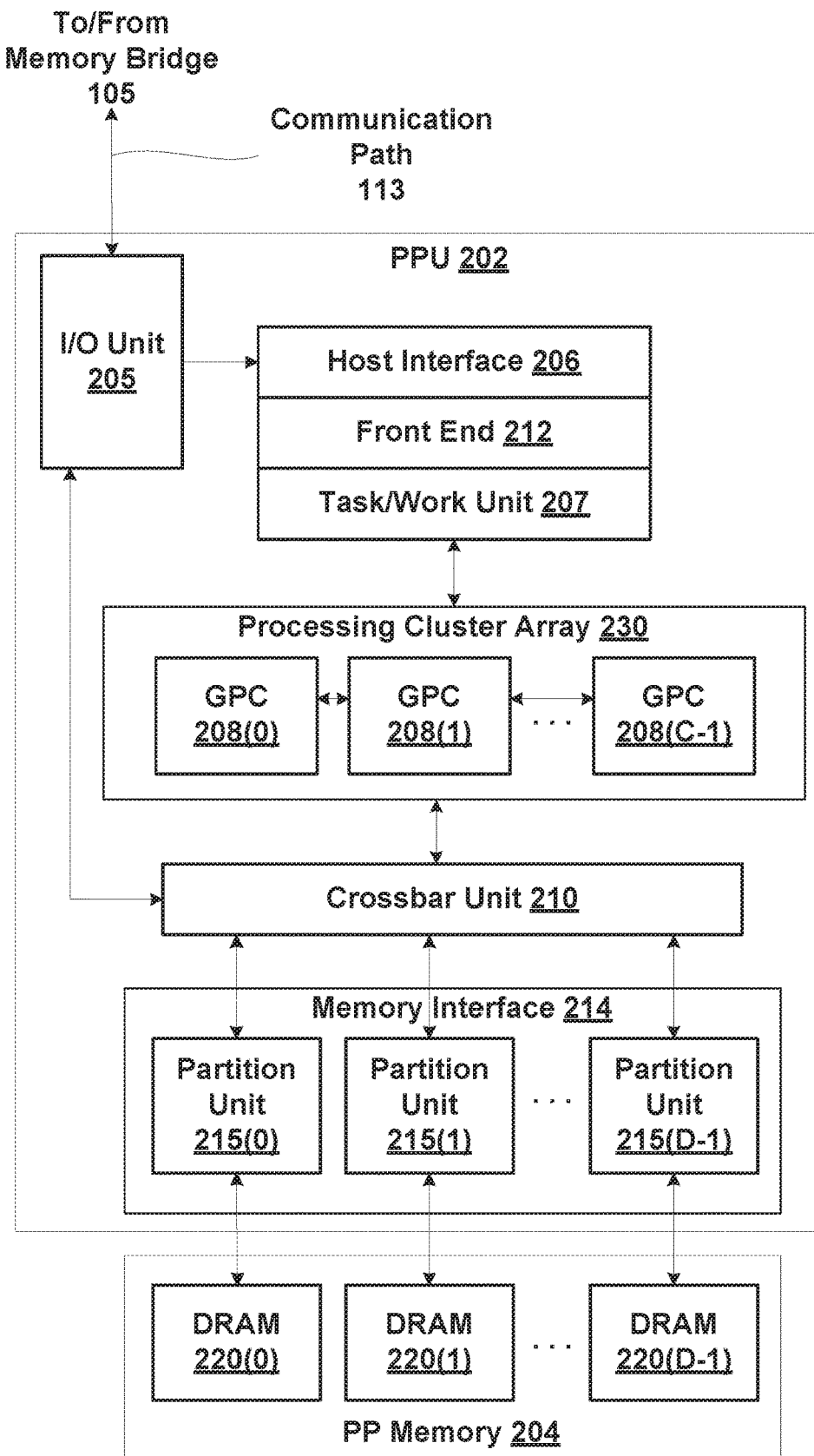
FIG. 2 is a block diagram of a parallel processing unit (PPU) included in the parallel processing subsystem of FIG. 1, according to various embodiments of the present invention.

FIG. 2 is a block diagram of a parallel processing unit (PPU) 202 included in the parallel processing subsystem 112 of FIG. 1, according to various embodiments of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to an optional display device 110 for display. In some embodiments, PPU 202 also may be configured for general-purpose processing and compute operations. In some embodiments, computer system 100 may be a server machine in a cloud computing environment. In such embodiments, computer system 100 may not have a display device 110. Instead, computer system 100 may generate equivalent output information by transmitting commands in the form of messages over a network via the network adapter 118.

In operation, in some embodiments, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a command queue, also referred to herein as a pushbuffer, to initiate processing of the stream of commands in the data structure. The PPU 202 reads command streams from the command queue and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each command queue and transmits the command stream stored in the command queue to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a command queue and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D 1. Each partition unit 215 is coupled to one or more dynamic random access memories (DRAMs) 220 residing within PPM memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
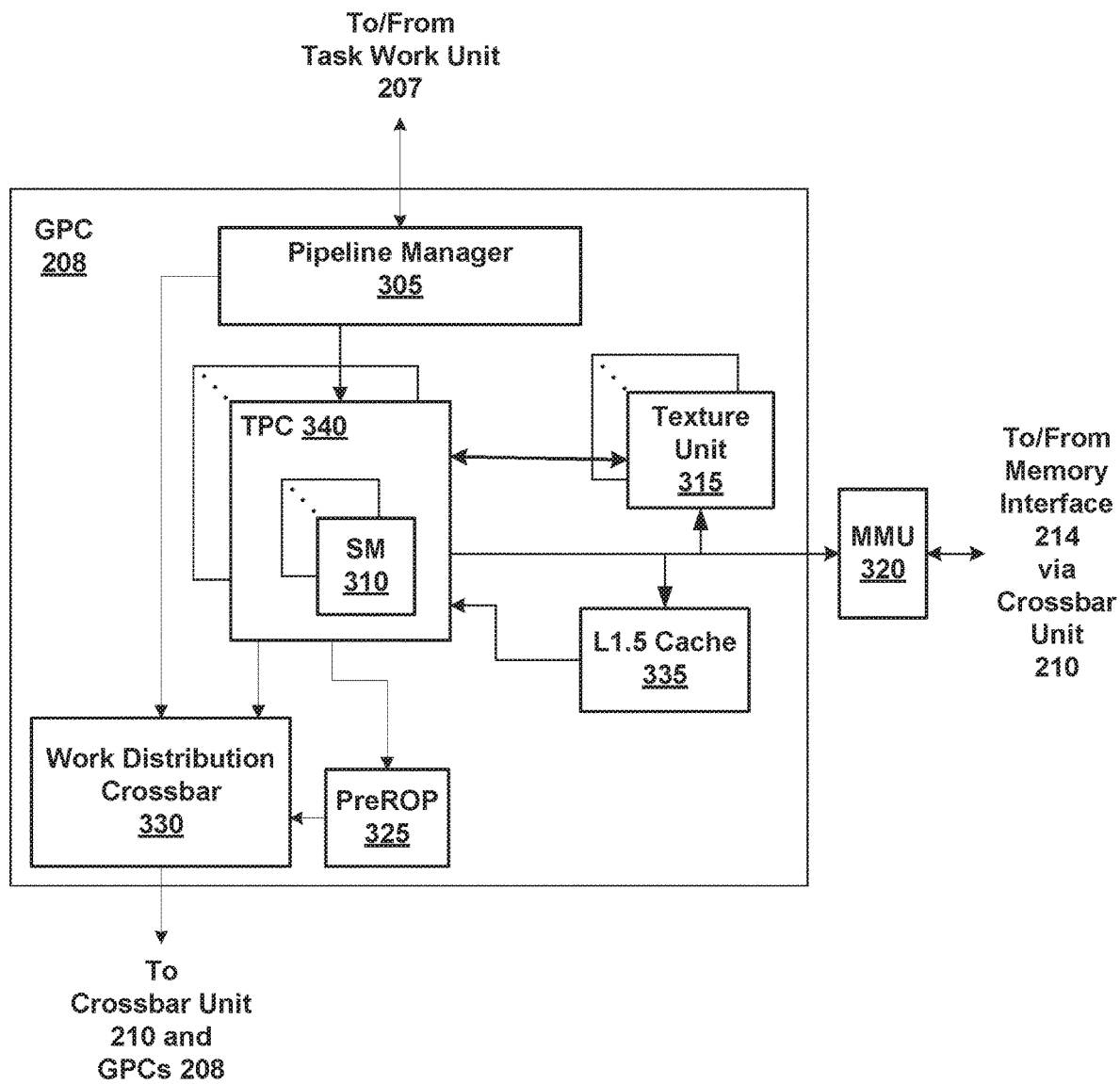
FIG. 3 is a block diagram of a general processing cluster (GPC) included in the parallel processing unit (PPU) of FIG. 2, according to various embodiments of the present invention.

FIG. 3 is a block diagram of a general processing cluster (GPC) 208 included in the parallel processing unit (PPU) 202 of FIG. 2, according to various embodiments of the present invention. As shown, the GPC 208 includes, without limitation, a pipeline manager 305, one or more texture units 315, a preROP unit 325, a work distribution crossbar 330, an L1.5 cache 335, and one or more texture processing clusters (TPCs) 340. The TPCs 340, texture units 315, and L1.5 cache 335 are coupled to an MMU 320.

Each TPC 340 includes multiple SMs 310 along with other associated circuitry (not shown). In one example, each TPC 340 includes two SMs 310. The task/work unit 207 launches CTAs that are directed to the TPCs 340 included in the various GPCs 408. The pipeline manager 305 receives a launched CTA from the task/work unit 207 and, in turn, transfers the CTA to the appropriate TPC 340. The TPC 340 then executes the CTA on one or more SMs 310 included in the TPC 340.

In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In various embodiments, GPC 208 includes a set of M of SMs 310, where M 1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In some embodiments, a single SM 310 may simultaneously support multiple CTAs, where such CTAs are at the granularity at which work is distributed to the SMs 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Dynamic Partitioning of Execution Resources

According to various embodiments of the present invention, the compute work distributer (CWD) within the GPU has been designed to include a credit-based system for dynamically partitioning and assigning of TPCs 340 to different subcontexts associated with different processes executing on the GPU. Among other things, such an approach results in more effective resource allocation across the different processes executing on the GPU and more efficient GPU execution. One CPU process can be associated with one or more subcontexts.

According to various embodiments of the present invention, during GPU initialization, a GPU device driver allocates a number of TPC credits to each subcontext, where each subcontext corresponds to a different process, and the number of TPC credits determines the maximum number of TPCs 340 that the subcontext can employ simultaneously. In some embodiments, the subcontexts may not correspond to separate processes. For example, a particular process could be associated with multiple subcontexts. When launching a new CTA for a particular subcontext during runtime, the CWD allocates one of the TPC credits for the corresponding subcontext by decrementing a credit counter associated with the subcontext. The CWD acquires the least loaded TPC 340 for non-exclusive use by that subcontext. Upon acquiring the TPC 340, the CWD assigns a virtual TPC identifier (ID) to the TPC 340 and provides the virtual TPC ID to the physical TPC 340 to which the new CTA is being launched. The physical TPC 340 then employs the virtual TPC ID when performing local memory address calculations for the new CTA. Later CTAs that belong to different subcontexts have different virtual TPC IDs. In general, the virtual TPC ID is used for CTAs associated with a particular subcontext. For example, a physical TPC 340 could have up to 64 virtual TPC IDs at the same time-one virtual TPC ID for each of 64 subcontexts. Threads within CTAs from a particular subcontext on a TPC 340 use that subcontext's virtual TPC ID for that TPC 340 to perform local memory address calculations.

In certain cases, the CWD may determine that the least loaded TPC 340 has already been acquired or that the subcontext launching the new CTA has no remaining TPC credits. In such cases, the CWD simply launches the CTA within the current set of acquired TPCs 340 associated with the subcontext.

As a general matter, the CWD is able to make the most efficient load balancing decisions when a subcontext launching a new CTA has available TPC credits. Therefore, various embodiments of the present invention contemplate techniques for releasing TPCs 340 and returning TPC credits whenever possible. In various embodiments, as the TPCs 340 execute their respective CTAs, the CWD keeps a count of the number of TPCs 340 that are executing CTAs for each subcontext. When a TPC 340 has completed execution of the CTAs for a given subcontext, then the CWD releases the virtual TPC ID associated with the particular TPC 340 back to the pool of available IDs for the subcontext and deallocates the corresponding TPC credit for the subcontext by incrementing the credit counter associated with the subcontext.

The TPC acquire and release mechanism described above dynamically adjusts the resources allocated to each subcontext during operation, which improves overall load balancing and GPU execution relative to prior art approaches. This TPC acquire and release mechanism is now described in greater detail.

Figure 4:
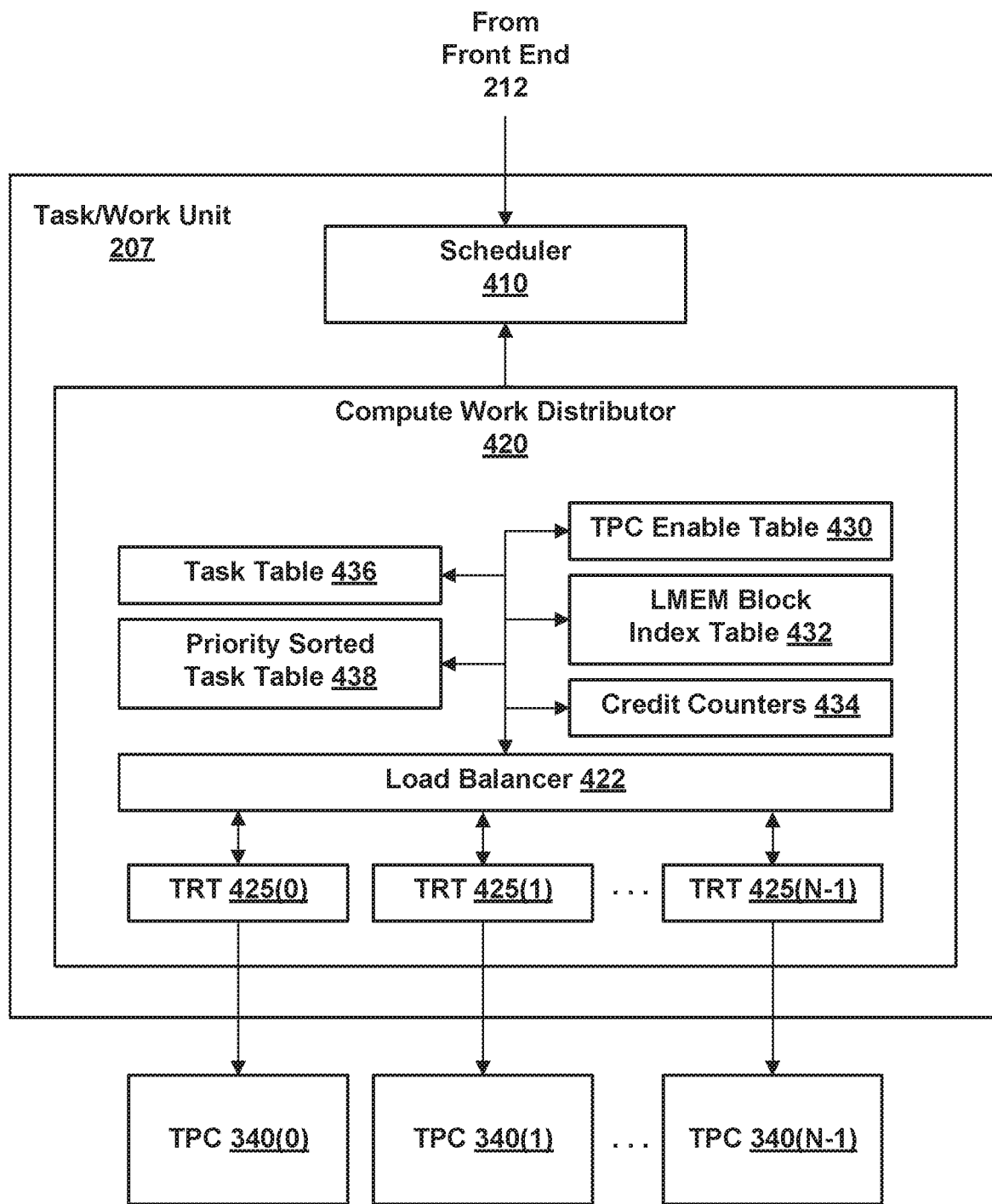
FIG. 4 is a more detailed view of the task/work unit of FIG. 2, according to various embodiments of the present invention.

FIG. 4 is a more detailed view of the task/work unit of FIG. 2, according to various embodiments of the present invention. As shown, the task/work unit 207 includes, without limitation, a scheduler 410 and a compute work distributor (CWD) 420. As also shown, the CWD 420 includes a load balancer 422, N TPC resource trackers (TRTs) 425(0), 425(1), . . . 425(N−1), a TPC enable table 430, a local memory (LMEM) block index table 432, credit counters 434, a task table 436, and a priority-sorted task table 438. Each of the TRTs 425(0), 425(1), . . . 425(N−1) communicates with a corresponding TPC 340(0), 340(1), . . . 340(N−1).

The scheduler 410 receives tasks from the front end 212 for various processes executing on the CPU 102. Each process executing on the CPU issues such tasks, where the tasks issued for a particular process are directed to one or more subcontexts. Each task corresponds to a group of CTAs to launch for the corresponding subcontext. In general, each task corresponds to one TMD and each TMD corresponds to one task. The scheduler 410 transmits tasks to the CWD 420. The CWD 420, in turn, maintains a task table 436 which includes separate task list for each subcontext. The task table 436 includes all tasks that have at least one CTA remaining to be launched or at least one CTA that is currently being executed (referred to herein as an in-flight CTA). The scheduler 410 further maintains a priority-sorted task table 438 which includes all tasks that have at least one CTA remaining to be launched. The tasks in the priority-sorted task table 438 are sorted by time of arrival to the CWD 420, by a specified priority value, or by a combination of time of arrival and priority value. In one example, tasks in the priority-sorted task table 438 could be sorted first by the specified priority values. Then each group of tasks with the same specified priority value could be sorted by time of arrival. When a task is received by the scheduler, the task is placed into the task table 436. The task is also placed on the priority-sorted task table 438 in the appropriate position according to the time of arrival and/or the specified priority value. Once all CTAs for a particular task have launched, the task is removed from the priority-sorted task table 438. However, the particular task remains on the task table 436 so long as one or more CTAs are in-flight CTAs. After all CTAs for the particular task have completed execution, no in-flight CTAs remain for the particular task. The particular task is then removed from the task table 436.

The processes executing on the CPU 102 continue to transmit new tasks for various subcontexts to the scheduler 410 via the front end 212. The scheduler 410 transmits such tasks to the CWD 420. The CWD 420, in turn, adds these new tasks to the task table 436 and the priority-sorted task table 438. Each task issued by a process includes one or more cooperative thread arrays (CTAs) to be launched for execution on the TPCs 340. In general, a particular task may include only one CTA or up to several thousands of CTAs. In operation, the CWD 420 selects a task from the priority-sorted task table 438 and assigns the task to one or more TRTs 425. Then each of the one or more TRTs 425 communicates with the corresponding TPC 340 to determine the number of free slots on each of the corresponding TPCs 340. Then, on each cycle, the load balancer 422 selects the TRT 425 with the largest number free slots, and the selected TRT 425 launches a CTA from the task to the TPC 340 corresponding to that TRT 425. TRTs 425 track free slots as CTAs are launched and completed, thereby allowing the load balancer 422 to select a TRT 425 for the next CTA launch.

In various embodiments, the PPU 202 may be configured to execute CTAs for any technically feasible number of subcontexts on any technically feasible number of TPCs 340. In one example, the PPU 202 could be configured to execute CTAs for up to 64 subcontexts on up to 42 TPCs 340. The 42 TPCs 340 could be distributed among 7 GPCs 408, where each GPC 408 includes 6 TPCs 340. Correspondingly, the CWD 420 would include 42 TRTs 425. In another example, the PPU 202 could be configured to execute CTAs for up to 16 subcontexts on up to 14 TPCs 340. The 14 TPCs 340 could be distributed among 7 GPCs 408, where each GPC 408 includes 2 TPCs 340. Correspondingly, the CWD 420 would include 14 TRTs 425.

Again, the CWD 420 includes, without limitation, a load balancer 422 and multiple TPC resource trackers (TRTs) 425(0), 425(1), . . . 425(N−1). During each clock cycle of the PPU 202, the load balancer 422 in the CWD 420 selects one task from the priority-sorted task table 438 that includes at least one CTA to be launched on one of the TPCs 340(0), 340(1), . . . 340(N−1). The load balancer 422 determines which TPCs 340 on which the CTAs for the selected task are enabled to execute, based on the TPC enable table 430. In general, the load balancer 422 selects the highest priority task that is eligible to execute on one or more TPCs 340. Then, the load balancer 422 assigns the task to all available TRTs 425. Each available TRT 425 transmits a request to the corresponding TPC 340 requesting the number of available slots. Each available TRT 425 receives a message from the corresponding TPC 340, where the message identifies the number of free slots available to execute CTAs on the corresponding TPC 340. Each available TRT 425 then posts a message to the load balancer 422, referred to herein as a "resource bid," which includes the number of free execution slots. For example, if each TPC 340 has four execution slots, then a TRT 425 for a TPC 340 that is not currently executing any CTAs would post a value of four. A TRT 425 for a TPC 340 that is currently executing one CTA would post a value of three, and so on. Each available TRT 425 corresponding to a TPC 340 with available slots posts a resource bid to the load balancer 422 that includes the number of available CTA execution slots.

After receiving the resource bids, the load balancer 422 selects a TPC 340 to execute the current CTA based on the resource bids from the TRTs 425. In particular, the load balancer 422 selects a TPC 340 to execute the current CTA based on the TPC 340 that has the highest number of available CTA execution slots. In general, the TPC 340 that has the highest number of available CTA execution slots has a processing load that is less than the processor loads associated with all other TPCs 340. If more than one TPC 340 has the same number of available slots, then the load balancer 422 may select any one of the TPCs 340 that has the highest number of available slots. The load balancer 422 decrements the credit counter 434 for the subcontext corresponding to the task. The load balancer 422 then unassigns the task from the available TRTs 425 that the load balancer 422 did not select. The selected TRT 425 then transmits CTAs for the task to the corresponding TPC 340.

In general, a task may be assigned to a given TRT 425 if the given TRT 425 is not currently assigned to another task and the subcontext for the task has at least one credit, as reflected in the corresponding credit counter 434. As further described herein, the TPC enable table 430 identifies, for each subcontext, which TPCs 340 are available to execute CTAs for the particular subcontext. As also further described herein, the CWD 420 also maintains the LMEM block index table 432, also referred to herein as a local memory (LMEM) block assignment table, that identifies the memory blocks that are designated to serve as local memory for each subcontext and each TPC 340

Each of the TRTs 425 performs various operations to manage execution of CTAs on the corresponding TPCs 340. Each TRT 425 maintains a count of the total number of execution slots on the corresponding TPC 340. Likewise, each TRT 425 maintains a count of the number of execution slots on the corresponding TPC 340 that are currently executing CTAs. The difference between these two counts is the number of execution slots that are available to execute incoming CTAs. In some embodiments, tasks whose CTAs consume differing amounts of TPC resources may have differing numbers of execution slots.

When a TRT 425 prepares a CTA to launch on the corresponding TPC 340, the TRT 425 prepares a launch packet that includes the CTA. The launch packet also includes the subcontext number for the subcontext corresponding to the CTA. The PPU 202 maintains a separate page directory base address for each subcontext so that each subcontext can have a separate virtual memory address space. The TRT 425 then transmits the prepared launch packet to the TPC 340 for execution. The TRT 425 further determines whether a local memory block has been assigned and is valid for the subcontext on that particular TPC 340. If not, then the TRT 425 is assigned a local memory block and updates the LMEM block index table 432 accordingly. Correspondingly, the launch packet includes local memory assignment information for the CTA, so that the TPC 340 can locate the assigned local memory blocks. In some embodiments, the virtual TPC ID may be the same as a local memory block index, where the local memory block index selects a region within memory allocated for a subcontext's use as local memory.

When a TPC 340 receives a launch packet from a TRT 425, the TPC 340 loads the CTA within the launch packet and prepares the CTA for execution. The TPC 340 retrieves the subcontext number from the launch packet and directs the TPC 340 to access the state data corresponding to the subcontext when executing the CTA. Each of the TPCs 340 maintains separate state data for each subcontext. In one example, if the PPU 202 supports 64 subcontexts, then each TPC 340 maintains 64 instances of state data, one instance of state data for each of the 64 subcontexts. In another example, if the PPU 202 supports 16 subcontexts, then each TPC 340 maintains 16 instances of state data, one instance of state data for each of the 16 subcontexts. The TPC 340 uses the subcontext number to retrieve the page directory base address to access the page table corresponding to the virtual address space corresponding to the subcontext. Finally, the TPC 340 retrieves the local memory assignment information from the launch packet and directs the TPC 340 to access the corresponding local memory blocks.

In some embodiments, the association between a subcontext number and a page directory base may be maintained in a memory management unit, such as MMU 320, where the memory management unit is responsible for virtual-address-to-physical-address mapping.

The process for launching CTAs to execute on TPCs 340 on behalf of various processes executing on the CPU 102 is now described in further detail.

In operation, multiple processes executing on the CPU 102 have various tasks for the PPU 202 to perform. Assuming the tasks associated with a given CPU process do not consume all of the resources of the PPU 202, the resources of the PPU 202 are not fully utilized by a single process executing on the PPU 202. Further, the PPU 202 executes in one context at a time. As a result, all tasks for all processes that are executing on the PPU 202 at a given time share certain functions. These shared functions include context scheduling and fault isolation. However, as further described herein, the PPU 202 accommodates multiple subcontexts within a given context, where each subcontext has a unique virtual address space and unique state data. As a result, subcontexts within a context have separate virtual address spaces and separate state data. However, the subcontexts within a context are scheduled together and undergo context switching together, as further described herein.

To accommodate separate virtual address spaces for each subcontext, the CWD 420 maintains subcontext numbers that each correspond to a page directory base address, where each page directory base address points to a particular page table. To accommodate unique state data for each subcontext, the entire PPU 202 maintains a separate instance of the state data for each subcontext. In particular, each of the TPCs 340 maintains a separate instance of the state data for each subcontext. When launching a CTA to execute on a given TPC 340, a TRT 425 includes the corresponding subcontext number in the launch packet transmitted to the TPC 340. In response, the TPC 340 accesses the correct instance of state data when executing the CTA corresponding to the subcontext number.

In some embodiments, even though each subcontext has a different virtual address space, two or more subcontexts could be set to the same virtual address space by setting page directory base address for the two or more subcontexts to the same address. In this manner, the two or more subcontexts share the same virtual address space but have separate state data. For example, certain subcontexts related to graphics functions and certain other subcontexts related to compute functions could execute with the same virtual address space but with separate state data.

The load balancer 422 in the CWD 420 maintains a TPC enable table 430 and an LMEM block index table 432. In operation, the load balancer 422 or an operating system or hypervisor executing on the CPU 102 initializes or updates TPC enable table 430. The load balancer 422, operating system, or hypervisor may initialize or update the TPC enable table 430 when the PPU 202 is initialized, a context is initialized, or the PPU 202 is otherwise in an idle state. In addition, the load balancer 422, operating system, or hypervisor may update cells within the TPC enable table 430 for certain subcontext rows, if those subcontexts are currently idle. In some embodiments, subcontext rows for subcontexts that are not currently idle may not be updated, in order to simplify the design by preventing read-write conflicts. Further, the load balancer 422, operating system, or hypervisor may update cells within the TPC enable table 430 for certain subcontext columns, if those TPCs 340 are currently idle. Again, in some embodiments, subcontext columns for TPCs 340 that are not currently idle may not be updated, in order to simplify the design by preventing read-write conflicts.

The TPC enable table 430 includes one row per subcontext and one column per TPC 340. A value of '1' in the cell of the TPC enable table 430 indicates that the subcontext corresponding to the row where the cell lies is permitted to execute on the TPC 340 corresponding to the column where the cell lies. A value of '0' in the cell of the TPC enable table 430 indicates that the subcontext corresponding to the row where the cell lies is prohibited from executing on the TPC 340 corresponding to the column where the cell lies.

The LMEM block index table 432 also includes one row per subcontext and one column per TPC 340. Each cell in the LMEM block index table 432 includes a virtual TPC identifier that identifies the virtual TPC that is assigned to the particular subcontext, corresponding to the row of the LMEM block index table 432. Each cell in the LMEM block index table 432 further identifies the physical TPC 340, corresponding to the column of the LMEM block index table 432, that is executing the virtual TPC for the subcontext. In addition, the virtual TPC identifier identifies a corresponding local memory block in the local memory that is bound to the physical TPC 340 corresponding to the column of the LMEM block index table 432 for the subcontext corresponding to the row of the LMEM block index table 432. In this manner, the LMEM block index table 432 identifies all currently active TPCs 340 for all subcontexts and the locations for the corresponding local memory blocks. Note that, in general, a local memory block may not be in use by two different TPCs 340 at the same time, in order to prevent two TPCs from writing to the same memory location, which would cause memory corruption. However, a local memory block assigned to a particular TPC 340 may be used by any SM 310 within the TPC 340. Further, LMEM blocks are assigned contiguously, where the virtual TPC identifiers in the LMEM block index table 432 range from 0 through the maximum credit count (as initially stored in the credit counters 434) minus 1. Finally, when a TPC 340 completes all CTAs for a given a subcontext and becomes idle, the corresponding local memory blocks are released for reassignment. Further, the credit counter 434 for the subcontext is incremented by one. If the subcontext launches a CTA launch to the same TPC 340 before the local memory block is released, then the CTA executes on the TPC 340 without the need to reassign the local memory block.

The PPU 202 may operate in three different modes: static TPC partitioning, dynamic TPC partitioning, and hybrid static/dynamic TPC partitioning. Static TPC partitioning, dynamic TPC partitioning, and hybrid static/dynamic TPC partitioning are also referred to herein as static resource allocation, dynamic resource allocation, and hybrid static/dynamic allocation, respectively. With static TPC partitioning, the operating system or hypervisor initializes and updates both the TPC enable table 430 and the LMEM block index table 432. In some embodiments related to TPC partitioning, CWD 420 may initialize and update the LMEM block index table 432. In some embodiments, the number of LMEM block indices may be the same as the number of TPCs 340, and, therefore, the mapping is not dynamically changed. Each subcontext is statically assigned to execute on particular TPCs 340. Further, each TPC 340 for each subcontext is assigned to particular virtual TPC identifiers, with the result that each subcontext has statically assigned local memory blocks for each TPC 340. In some embodiments of static TPC partitioning, the credit count is not used, because virtual TPC identifiers are not changed.

With dynamic TPC partitioning, the operating system or hypervisor initializes and updates the TPC enable table 430, while the CWD 420 updates the LMEM block index table 432 dynamically based on incoming tasks and current loading of the TPCs 340. Each subcontext receives an initial credit count that identifies the maximum number of TPCs 340 on which the subcontext can execute at any given time. The load balancer 422 in the CWD 420 loads this initial credit count into the credit counter 434 for each subcontext. For example, if the initial credit count is three, then each subcontext can execute CTAs on up to three TPCs 340 at any given time. A given subcontext could execute on any three available TPCs 340, where the available TPCs 340 are identified by the TPC enable table 430. After launching a CTA to a given TPC 340, the load balancer 422 decrements the credit counter 434 for the corresponding subcontext.

With hybrid static/dynamic TPC partitioning, each subcontext is constrained to execute on a specified subset of the total number of TPCs 340. Within the specified subset of TPCs 340, the subcontext may execute CTAs on any of the TPCs 340 included in the subset of TPCs 340 and to assign any local memory blocks in local memory corresponding to that same subset of TPCs 340, subject to a maximum credit count for the given subcontext.

With static TPC partitioning, dynamic TPC partitioning via a credit count, and hybrid static/dynamic TPC partitioning via a credit count, the number of TPCs 340 that each subcontext can use at one time can be limited. Correspondingly, the number of local memory blocks that each subcontext can be assigned at one time can likewise be limited.

In some embodiments, the PPU 202 may operate in partial dynamic mode. In such embodiments, each subcontext may be assigned to a portion of the total number of TPCs 340. However, within the assigned portion of TPCs 340, each subcontext can execute on any specific TPCs 340 up to the initial credit count stored in the credit counter 434. For example, if a PPU 202 supports 64 subcontexts and 42 TPCs 340, then the TPC enable table 430 could specify that each of subcontexts 0 through 31 could execute on any TPCs from 0 through 20, and each of subcontexts 32 through 63 could execute on any TPCs from 21 through 42. If each subcontext receives an initial credit count of 3, then each of subcontexts 0 through 31 could execute on any 3 TPCs from 0 through 20. Similarly, each of subcontexts 32 through 63 could execute on any 3 TPCs from 21 through 42.

In general, CTAs are launched to the available TPC 340 that currently has the smallest workload, within the constraints of the number of credits the subcontext has and the static TPC enable table 430 that identifies the available set of TPCs 340 for each context. This approach may provide improved fairness in scheduling and allocation relative to prior approaches.

By way of a particular example, consider a PPU 202 configured to receive tasks for two subcontexts executing on four TPCs 340. The priority-sorted task list 438 includes three tasks: a first task for subcontext 0, a first task for subcontext 1, and a second task for subcontext 0, in order of decreasing priority. Each subcontext receives an initial credit count of three. The load balancer 422, or other hardware and/or software on the CPU 102, initializes the credit counter 434 for each subcontext with a value of three, indicating that each subcontext may be executing CTAs on up to three of the four TPCs at any given time. After initialization, the scheduler 410 receives the three tasks and transmits the tasks to the CWD 420. The load balancer 422 in the CWD 420 receives the tasks, where each of the tasks corresponds to a set of one or more CTAs. The load balancer 422 stores the received tasks in the task table 436 and the priority-sorted task table 438. Since subcontext 0 has credits available, and none of the TRTs 425 currently have a task, load balancer 422 assigns the received first task for subcontext 0 to all the TRTs 425 as an eligible task. Each TRT 425, that has an eligible task, communicates with the TRT's 425 corresponding TPC 340, and receives a free slot count. Assuming all TPCs 340 have four free slots, each TRT 425 posts a resource bid to the load balancer 422 indicating that four execution slots are available. After receiving the resource bids, the load balancer 422 selects a TRT 425 to launch a CTA to the corresponding TPC 340, based on the resource bids from the TRTs 425. The selected TRT 425 prepares a launch packet for the CTA and transmits the launch packet to TPC 340. If a local memory block is not already assigned, which is the case in this point of the example, then the TRT 425 assigns a local memory block for the CTA executing on the TPC 340. The load balancer 422 decrements the credit counter 434 for subcontext 0 from 3 to 2. This process proceeds to select the next TRT 425 to launch a CTA, which causes the load balancer 422 to decrement the credit counter 434 for subcontext 0 from 2 to 1. This process continues to select the next TRT 425 to launch a CTA, which causes the load balancer 422 to decrement the credit counter 434 for subcontext 0 from 1 to 0. At this point, the load balancer 422 may not use the fourth TRT 425 for subcontext 0, so the task is unassigned from the fourth TRT 425, making that TRT 425 available for a task from a different subcontext.

The load balancer 422 now selects the first task for subcontext 1 from the priority sorted task table 438. Because subcontext 0 has no remaining credits, and there is an available TRT 425, the scheduler selects the task for subcontext 1 and assigns the task to the remaining TRT 425. That TRT 425 then launches CTAs on the corresponding TPC 340, and the load balancer 422 decrements the credit counter 434 for subcontext 1 from 3 to 2. If subcontext 0 and subcontext 1 are nonexclusive, then, when all the CTAs for the first task have been launched, and the first task is unassigned from the three TRTs 425, then the task for subcontext 1 may use up to two more TRTs 425, in addition to the one TRT 425 that the task currently has. If subcontext 0 and subcontext 1 are exclusive, then subcontext 1 waits until at least one TPC 340 completes execution of all CTAs for subcontext 0 and then can have the subcontext 1 task assigned to one of the first three TRTs 425 that completed execution of all CTAs for subcontext 0.

The load balancer 422 now selects the second task for subcontext 0 from the priority-sorted task table 438. Subcontext 0 has zero credits, so the second task for subcontext 0 waits until all the CTAs for the first task for subcontext 0 are launched, even though there is an available TRT 425. When all the CTAs from the first task for subcontext 0 are launched, then the task is unassigned from the TRTs 425, making the TRTs available for a new task.

When a TPC 340 completes execution of CTAs for a particular task, the behavior of the load balancer 422, TRTs 425, and TPCs 340 depending on the current status for all tasks in the priority-sorted task table 438. Continuing with the above example, consider a situation where three of the four TPCs 340 are executing CTAs for the first task for subcontext 0 while one of the four TPCs 340 is executing CTAs for the first task for subcontext 1. The current value of the credit counters 434 for subcontext 0 and subcontext 1 are 0 and 2, respectively. The second TPC 340 of the three TPCs 340 executing CTAs for the first task for subcontext 0 completes execution of all CTAs.

In a first scenario, the first task for subcontext 0 has additional CTAs to launch. In this first scenario, the TRT 425 corresponding to the second TPC 340 launches additional CTAs for the first task for subcontext 0 to the second TPC 340. In a second scenario, all CTAs for the first task for subcontext 0 have been launched. Therefore, the first task for subcontext 0 has been removed from the priority-sorted task table 438. In this second scenario, the first task for subcontext 1 has additional CTAs to launch. The load balancer 422 increments the credit counter 435 for subcontext 0 from 0 to 1. The load balancer 422 assigns the first task for subcontext 1 to all available TRTs 425. The load balancer 422 selects one of the available TRTs 425. The selected TRT 425 may be the TRT 425 associated with the second TPC 340 or, in the alternative, may be the TRT 425 associated with any other TPC 340. The load balancer 422 decrements the credit counter 435 for subcontext 1 from 2 to 1. The selected TRT 425 then issues CTAs for the first task for subcontext 1 to the corresponding TPC 340. Note that if the first task for subcontext 1 has no remaining unlaunched CTAs, then the load balancer 422 unassigns the first task for subcontext 1 from the non-selected TRTs 425. Otherwise, if the first task of the subcontext 1 still has unlaunched CTAs, then the first task for subcontext 1 is not unassigned from any TRT 425 until subcontext 1 subsequently has non remaining credits. In a third scenario, neither the first task for subcontext 0 nor the first task for subcontext 1 has additional CTAs to launch. Therefore, the first task for subcontext 0 and the first task for subcontext 1 have been removed from the priority-sorted task table 438. In this third scenario, the TRT 425 corresponding to the second TPC 340 launches CTAs for the second task for subcontext 0 to the second TPC 340. In this manner, tasks and associated subcontexts migrate among the various TRTs 425 based on dynamic load conditions of the associated TPCs 340 over time.

In some embodiments, certain subcontexts may be prohibited from executing on the same TPC 340 at the same time. In some embodiments, the CWD 420 may maintain an exclusive allocation table with one bit per subcontext to identify whether that subcontext is exclusive. If a particular subcontext is identified as exclusive, then no other subcontext may be allowed to execute on a given TPC 340 when the exclusive subcontext is executing on that same TPC 340. In some embodiments, the CWD 420 may maintain an exclusive allocation table that identifies whether certain pairs of subcontexts are exclusive. In such embodiments, the rows and the columns of the exclusivity tables represent subcontexts. A '1' in a particular cell may identify that the two corresponding subcontexts are pairwise exclusive. Two subcontexts that are pairwise exclusive may be prohibited from executing CTAs on the same TPC 340 at the same time. If two subcontexts are pairwise exclusive with respect to each other, and the first subcontext is executing CTAs on a given TPC 340, then the second subcontext waits until the CTAs for the first subcontext complete execution prior to launching CTAs on the same TPC 340.

It will be appreciated that the system shown herein is illustrative and that variations and modifications are possible. For example, in the described embodiments, a value of '1' indicates that certain items are enabled, permitted, allocated, or assigned while a value of '0' indicates certain items are disabled, prohibited, unallocated, or not assigned. Any other appropriate values may be employed within the scope of the invention.

FIGS. 5A-5B illustrate a TPC enable table 500 and an LMEM block index table 550 for static TPC partitioning, according to various embodiments of the present invention.

The TPC enable table 500 and the LMEM block index table 550 function substantially the same as the TPC enable table 430 and the LMEM block index table 432 of FIG. 4, except as further described below. As shown, the TPC enable table 500 includes subcontext rows 510 and TPC columns 520. Each cell in the TPC enable table 500 is set to '1,' indicating that any subcontext can execute on any TPC 340. The LMEM block index table 550 likewise includes subcontext rows 560 and TPC columns 570. Each cell in the LMEM block index table 550 identifies a virtual TPC identifier for a particular subcontext executing on a particular TPC 340. The virtual TPC identifier included in each cell of the LMEM block index table 550 further identifies a location of the local memory block for the subcontext when executing CTAs on the corresponding TPC 340.

FIGS. 6A-6B illustrate a TPC enable table 600 and an LMEM block index table 650 for static TPC partitioning, according to other various embodiments of the present invention. The TPC enable table 600 and the LMEM block index table 650 function substantially the same as the TPC enable table 430 and the LMEM block index table 432 of FIG. 4, except as further described below. As shown, the TPC enable table 600 includes subcontext rows 610 and TPC columns 620. The subcontext row 610 for subcontext 0 includes two cells set to '1' corresponding to TPC 0 and TPC 1. The remaining cells in the subcontext row 610 for subcontext 0 are set to '0.' Consequently, subcontext 0 can execute CTAs on TPC 0 and TPC 1, but on no other TPCs 340. Similarly, the subcontext row 610 for subcontext 0 includes two cells set to '1' corresponding to TPC 1 and TPC 2. The remaining cells in the subcontext row 610 for subcontext 1 are set to '0.' Consequently, subcontext 0 can execute CTAs on TPC 1 and TPC 2, but on no other TPCs 340. The cells for the remaining subcontext rows 610 of the TPC enable table 600 are set in similar fashion. As a result, each subcontext may execute on up to two specified TPCs 340, as identified by the TPC enable table 600, and each TPC is limited to executing CTAs for only two subcontexts.

The subcontext row 660 for subcontext 0 in the LMEM block index table 650 is set to '0' and '1' for TPC 0 and TPC 1, respectively. These values indicate that virtual TPC identifier 0 for subcontext 0 corresponds to physical TPC 0 and virtual TPC identifier 1 for subcontext 0 corresponds to physical TPC 1. These virtual TPC identifiers further identify a location of the local memory block for subcontext 0 when executing CTAs on the corresponding TPC 340. The remaining cells in the subcontext row 660 for subcontext 0 are set to X (don't care) because subcontext 0 is not allowed to execute on any of the remaining TPCs 340.

The subcontext row 660 for subcontext 1 in the LMEM block index table 650 is set to '0' and '1' for TPC 1 and TPC 2, respectively. These values indicate that virtual TPC identifier 0 for subcontext 1 corresponds to physical TPC 1 and virtual TPC identifier 1 for subcontext 1 corresponds to physical TPC 2. These virtual TPC identifiers further identify a location of the local memory block for subcontext 1 when executing CTAs on the corresponding TPC 340. The remaining cells in the subcontext row 660 for subcontext 1 are set to X (don't care) because subcontext 1 is not allowed to execute on any of the remaining TPCs 340. The cells for the remaining subcontext rows 660 of the LMEM block index table 650 are set in similar fashion.

FIG. 7 illustrates a TPC enable table 700 for dynamic TPC partitioning, according to various embodiments of the present invention. The TPC enable table 700 functions substantially the same as the TPC enable table 430 of FIG. 4, except as further described below. As shown, the TPC enable table 700 includes subcontext rows 710 and TPC columns 720. Each cell in the TPC enable table 700 is set to '1,' indicating that any subcontext can execute on any TPC 340, subject to credit count constraints. The LMEM block index table (not shown) is set dynamically by the load balancer 422 based on the current credit count stored in the credit counter 434 for each subcontext and on the current execution load on each TPC 340, as further described herein.

FIG. 8 illustrates a TPC enable table 800 for dynamic TPC partitioning, according to other various embodiments of the present invention. The TPC enable table 800 functions substantially the same as the TPC enable table 430 of FIG. 4, except as further described below. As shown, the TPC enable table 800 includes subcontext rows 810 and TPC columns 820. Each subcontext row 810 for subcontext 0 through subcontext 7 includes a '1' in the cells for TPC 0 through TPC 6, and a '0' in the remaining cells. Consequently, each of subcontext 0 through subcontext 7 may execute CTAs on any one or more of TPC 0 through TPC 6, subject to credit count constraints. Similarly, each subcontext row 810 for subcontext 8 through subcontext 15 includes a '1' in the cells for TPC 7 through TPC 13, and a '0' in the remaining cells. Consequently, each of subcontext 8 through subcontext 15 may execute CTAs on any one or more of TPC 7 through TPC 13, subject to credit count constraints. The LMEM block index table (not shown) is set dynamically by the load balancer 422 based on the current credit count stored in the credit counter 434 for each subcontext and on the current execution load on each TPC 340, as further described herein.

Figure 9A:
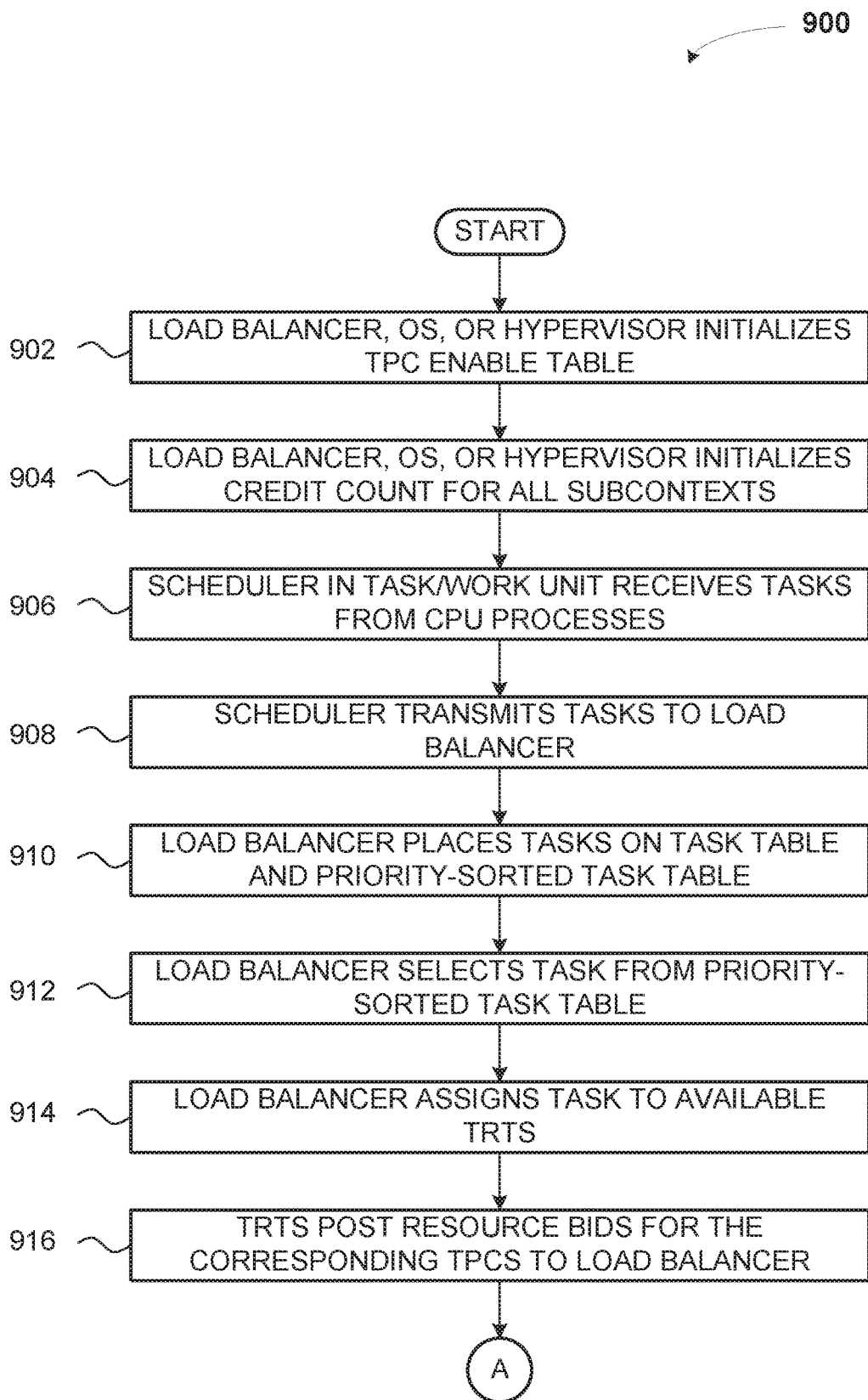
FIGS. 9A-9C set forth a flow diagram of method steps for allocating execution resources within a processor, according to various embodiments of the present invention.
Figure 9B:
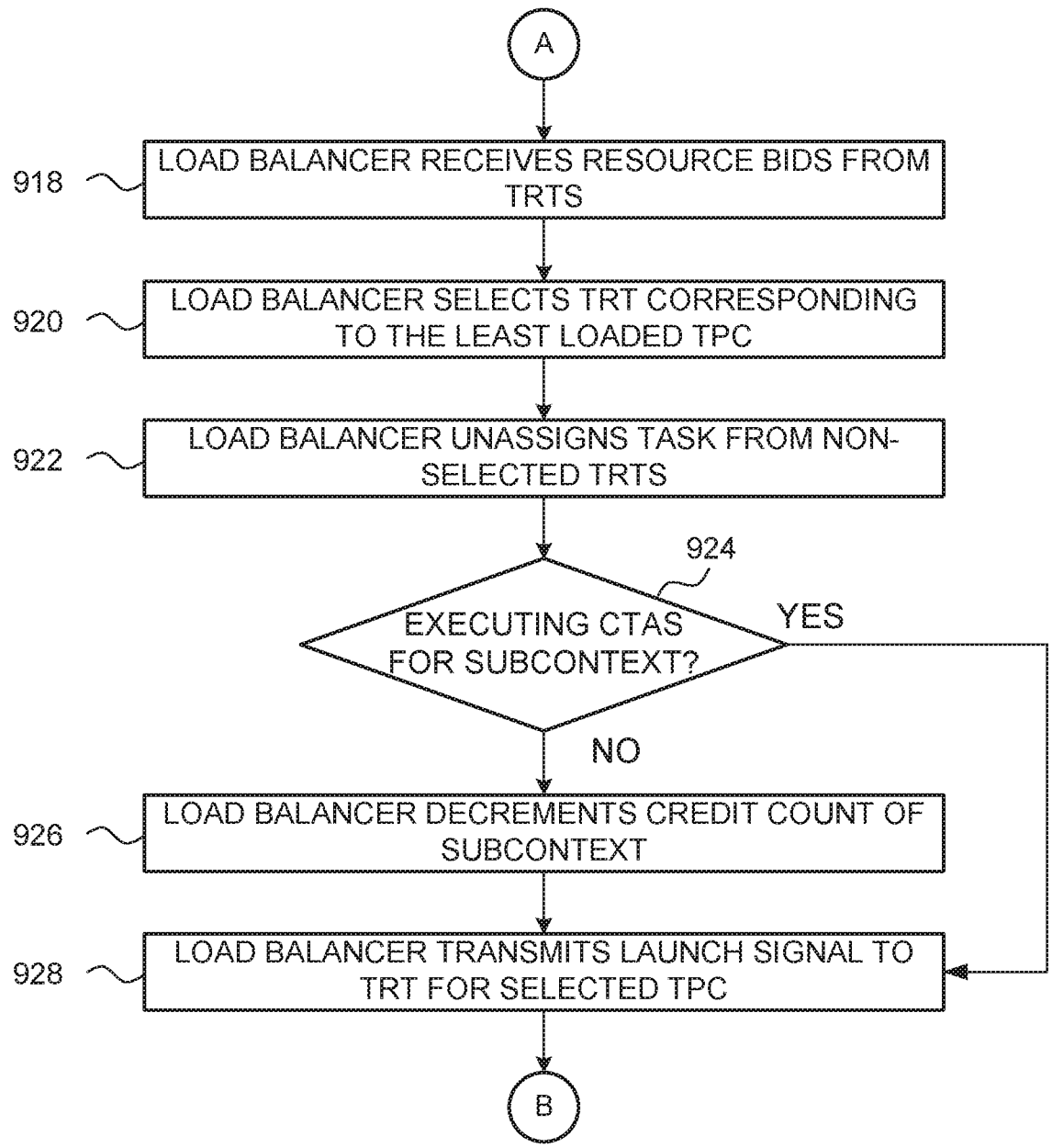
Figure 9C:
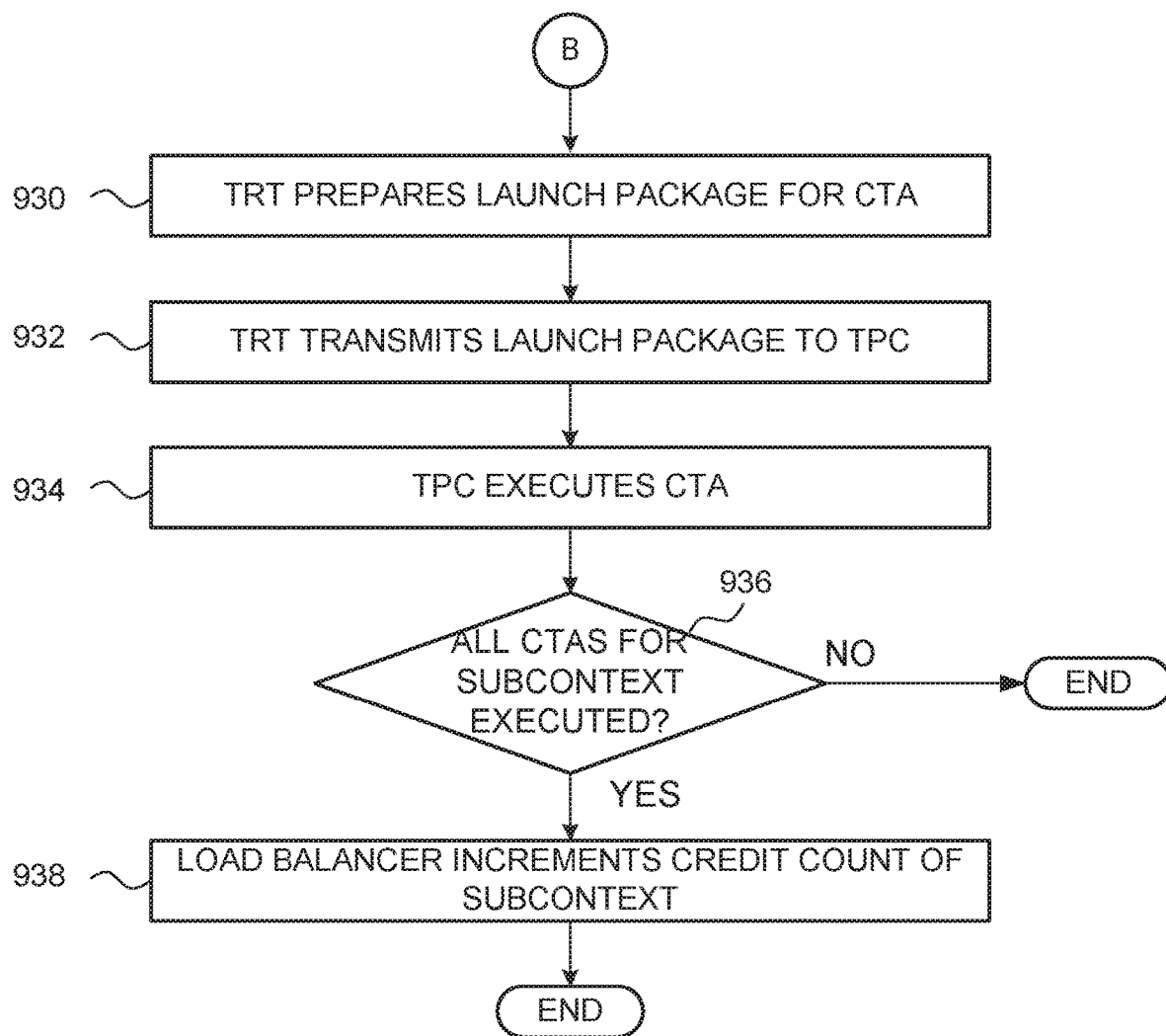

FIGS. 9A-9C set forth a flow diagram of method steps for allocating execution resources within a processor, according to various embodiments of the present invention. Although the method steps are described in conjunction with the systems of FIGS. 1-8, persons skilled in the art will understand that any system configured to perform the method steps, in any order, is within the scope of the present invention.

As shown, a method 900 begins at step 902, where the load balancer 422 in the CWD 420, an operating system (OS) executing on the CPU 102, or a hypervisor executing on the CPU 102 initializes a TPC enable table that identifies the TPCs 340 that are allowed to execute CTAs for each subcontext. If static TPC partitioning is employed, then the load balancer 422, operating system, or hypervisor also initializes the local memory (LMEM) block index table that identifies the virtual TPC identifiers and local memory block locations for each subcontext when executing CTAs on a TPC 340. If dynamic or hybrid TPC partitioning is employed, then the load balancer 422 initializes and updates the LMEM block index table. At step 904, the load balancer 422, the operating system (OS), or the hypervisor initializes the initial credit count in the CWD 420 for each subcontext. The initial credit count represents the maximum number of TPCs that can be executing CTAs for a subcontext at a given time. In one example, if the initial credit count is three, then each subcontext may have up to three TPCs executing one or more CTAs at any given time. If each TPC can accommodate four CTAs, then up to twelve CTAs could be executing at any given time.

At step 906, the scheduler 410 in the task/work unit 207 receives tasks from various processes executing on the CPU 102, where each task corresponds to one or more CTAs. Each process issues such tasks to one or more subcontexts executing in the PPU 202. At step 908, the scheduler 410 transmits the received tasks to the load balancer 422 in the CWD 420. At step 910, the load balancer 422 places each received task in an appropriate location on the task table 436 and the priority-sorted task table 438, according to the time of arrival and/or the selected priority value corresponding to the task. At step 912, the load balancer 422 selects a task from the priority-sorted task table 438. The scheduler 410 may select any task for a subcontext that does not have a current credit of zero. In general, the load balancer 422 selects such a task that has also has the highest priority. In some embodiments, each TRT 425 may be executing CTAs for different tasks, and each task may correspond to more than one CTA. The load balancer 422 may consider resource bids received from each TRT 425 when selecting a TPC 340 to execute CTAs for a particular task, as further described herein.

At step 914, the load balancer 422 assigns the selected task to all available TRTs 425 that correspond to TPCs 340 enabled to execute the task's CTAs based on the TPC enable table. At step 916, each TRT 425 posts a resource bid to the load balancer 422, where the resource bid is for a corresponding TPC 340. The resource bid from a TRT 425 indicates the number of available CTA execution slots on the corresponding TPC 340. At step 918, the load balancer 422 receives resource bids from each of the available TRTs 425, where each resource bid from a TRT 425 includes the number of available CTA execution slots on the corresponding TPC 340. At step 920, the load balancer 422 selects the TRT 425 corresponding to the TPC 340 that is least loaded, that is, the TPC 340 with the highest number of free CTA execution slots. If multiple TPCs 340 have the same number of available CTA execution slots, then the load balancer 422 selects any one TPC 340 from among the TPCs 340 that have the highest number of available CTA execution slots. At step 922, the load balancer 422 unassigns the task from the non-selected TRTs 425.

At step 924, the load balancer 422 determines whether the TPC 340 for the selected TRT 425 is executing any CTAs for the subcontext associated with the task. If the TPC 340 for the selected TRT 425 is not executing any CTAs for the subcontext, then the method 900 proceeds to step 926, where the load balancer 422 decrements the credit counter 434 of the subcontext corresponding to the task. The method then proceeds to step 928, described below. If, at step 924, the TPC 340 for the selected TRT 425 is executing CTAs for the subcontext, then the method 900 proceeds to step 928, where the load balancer 422 transmits a launch signal to the TRT 425 corresponding to the selected TPC 340.

At step 930, the TRT 425 in the CWD 420 prepares a launch package that includes the CTA. The launch packet also includes the subcontext number that is used to identify a corresponding page directory base address for the subcontext, and also identifies the state data for the subcontext, for the CTA. The launch packet includes local memory assignment information for the CTA, so that the TPC 340 can locate the assigned local memory blocks.

At step 932, the TRT 425 transmits the launch package to the corresponding TPC 340. At step 934, the TPC 340 executes the CTA. At step 936, the load balancer 422 determines whether the TPC 340 has completed execution of the last CTA executing on the TPC 340 for the subcontext. If the TPC 340 has completed execution of the last CTA executing on the TPC 340 for the subcontext, then the method 900 proceeds to step 938, where the load balancer 422 increments the corresponding credit counter 434 for the particular subcontext by one. The method 900 then terminates. If, at step 934, the TPC 340 has not completed execution of the last CTA executing on the TPC 340 for the subcontext, then the method 900 terminates.

Figure 10A:
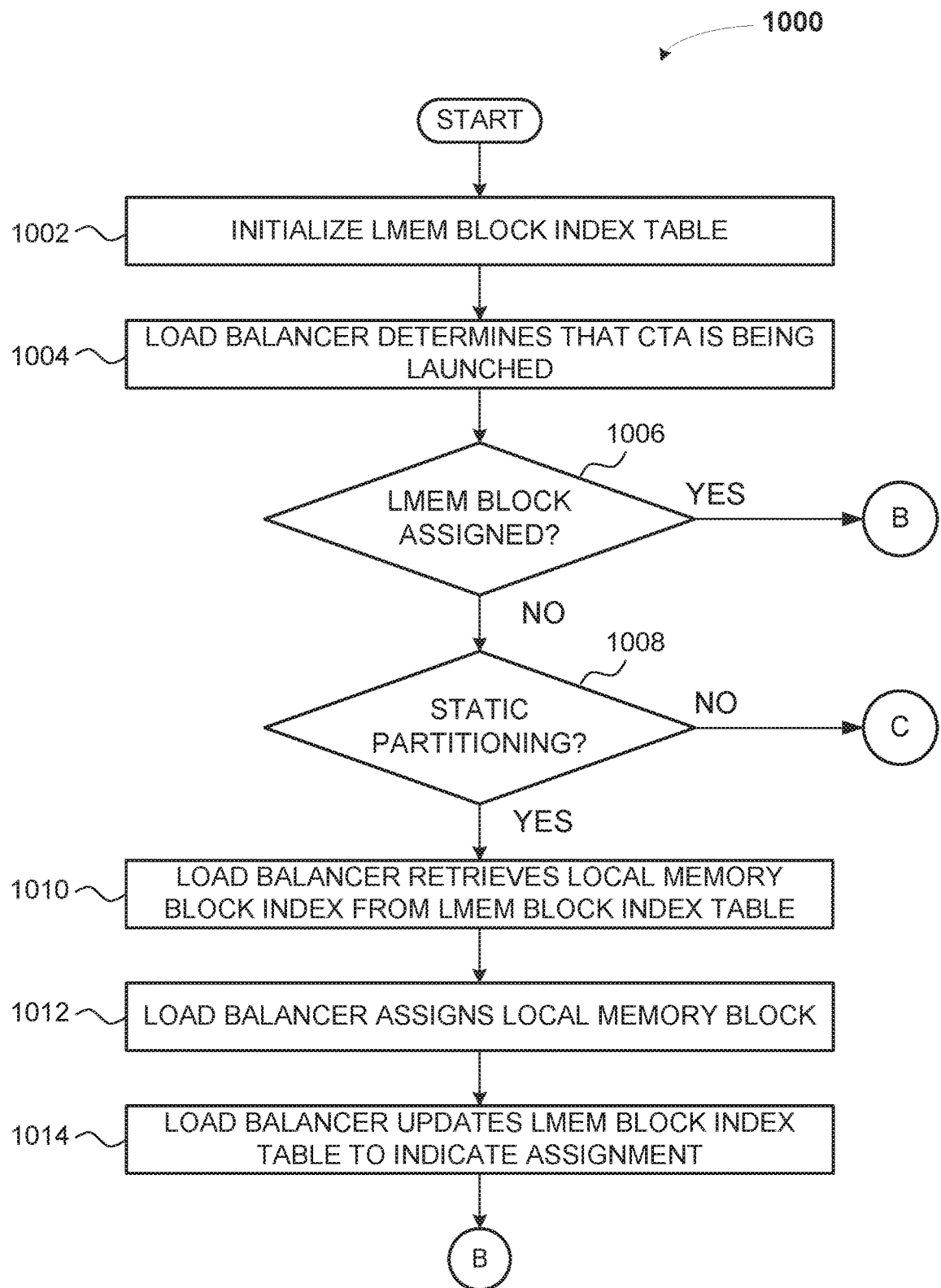
FIGS. 10A-10B set forth a flow diagram of method steps for assigning local memory resources within a processor, according to various embodiments of the present invention.
Figure 10B:
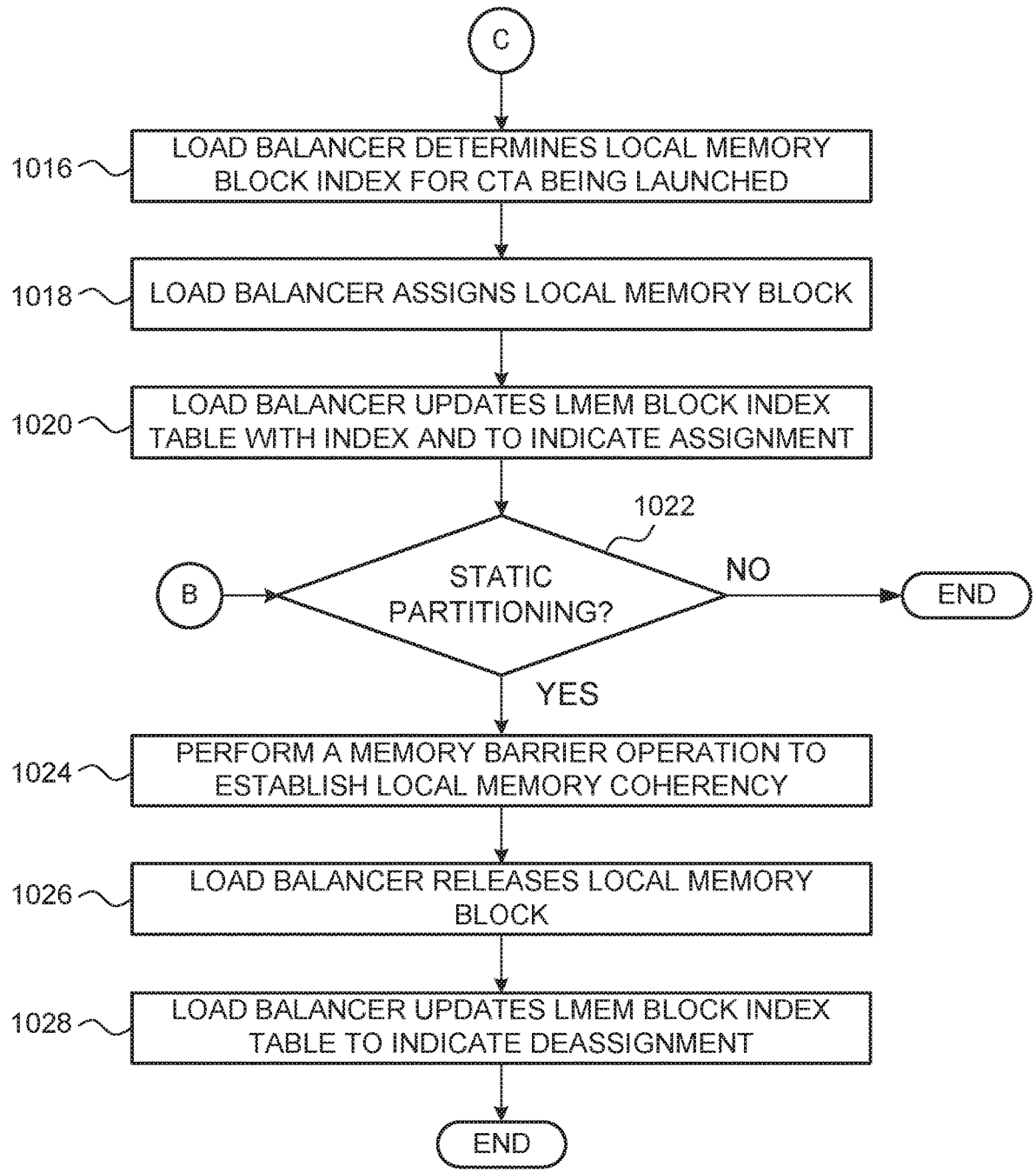

FIGS. 10A-10B set forth a flow diagram of method steps for assigning local memory resources within a processor, according to various embodiments of the present invention. Although the method steps are described in conjunction with the systems of FIGS. 1-8, persons skilled in the art will understand that any system configured to perform the method steps, in any order, is within the scope of the present invention.

As shown, a method 1000 begins at step 1002, where the local memory (LMEM) block index table is initialized. The LMEM block index table identifies the virtual TPC identifiers and local memory block locations for each subcontext when executing CTAs on an TPC 340. If static TPC partitioning is employed, then the operating system or hypervisor initializes the LMEM block index table. If dynamic or hybrid TPC partitioning is employed, then the CWD 420 initializes and updates the LMEM block index table. At step 1004, the load balancer 422 in the CWD 420 determines that a TRT 425 is launching a CTA for execution on a TPC 340. Launching of a CTA occurs independently from assigning a local memory block. A CTA can be launched for execution prior to, concurrently with, or after assignment of the corresponding local memory block to the TPC. In general, the TPC 340 that the CTA is being launched to is associated with a local memory block, where the local memory block is for the subcontext corresponding to the CTA. Typically, the local memory block is associated with the TPC 340 rather than the CTA. The CTA does not begin execution until the corresponding local memory block is assigned. At step 1006, the load balancer 422 determines whether a local memory block has already been assigned to the TPC where the CTA is being launched. If a local memory block has already been assigned, then the method 1000 proceeds to step 1022, described below. If a local memory block has not already been assigned to the CTA being launched, then the method 1000 proceeds to step 1008, where the load balancer 422 determines whether static TPC partitioning is employed.

If static TPC partitioning is employed, then the method 1000 proceeds to step 1010, where the load balancer 422 looks up the local memory block index from the LMEM block index table. The load balancer 422 identifies the location for the cell in the LMEM block index table corresponding to the subcontext for the CTA being launched and the TPC 340 selected to execute the CTA. The load balancer 422 retrieves the local memory block index from the identified cell in the LMEM block index table. At step 1012, the load balancer 422 assigns a local memory block corresponding to the local memory block index. The load balancer 422 assigns the local memory block from the local memory pool for the subcontext. Once the local memory block is assigned, all CTAs executing on all SMs 310 in the corresponding TPC 340 are able to access memory locations within the local memory block. At step 1014, the load balancer 422 updates the cell in the LMEM block index table to indicate that the local memory block has been assigned. The method 1000 then proceeds to step 1022, described below.

Returning to step 1008, if at step 1008, static TPC partitioning is not employed, then either dynamic TPC partitioning or hybrid static/dynamic TPC partitioning is employed. In such cases, the method 1000 proceeds to step 1016, where the load balancer 422 determines the local memory block index for the local memory block to be assigned to the CTA being launched. Local memory blocks may be assigned contiguously, randomly, or by any algorithm that does not allow the same local memory block to be used simultaneously on different TPCs 340. For example, if the CTA being launched corresponds to a subcontext where local memory blocks have already been assigned for local memory block indices 0, 1, and 2, then the load balancer 422 could assign the next local memory block for the subcontext using local memory block index 3. If, subsequently, local memory block 1 is released while local memory blocks 0, 2, and 3 remain assigned, then the load balancer 422 could assign the next local memory block for the subcontext using local memory block index 1.

At step 1018, in some embodiments, the load balancer 422 may assign a local memory block corresponding to the local memory block index. The load balancer 422 assigns the local memory block from the local memory pool. Once the local memory block is assigned, all CTAs executing on all SMs 310 in the corresponding TPC 340 are able to access memory locations within the assigned local memory block. At step 1020, the load balancer 422 updates the cell in the LMEM block index table corresponding to the local memory block with the local memory block index and to indicate that the local memory block has been assigned.

At step 1022, the load balancer 422 determines whether all CTAs accessing the local memory block have completed execution and no longer need access to the local memory block. If all CTAs accessing the local memory block have not completed execution, then the method 1000 terminates. If, on the other hand, all CTAs accessing the local memory block have completed execution, then the method 1000 proceeds to step 1024, where, before the local memory block becomes unassigned, the load balancer 422 performs a memory barrier is done in order to ensure that all local memory writes from the TPC 340 have reached the point of memory coherency. Further, the memory barrier ensures that a different TPC 340 using the same local memory block does not result in local memory corruption. In particular, the memory barrier ensures that when the local memory block is reassigned, there are no outstanding writes from the previous TPC that may change the data in local memory. At step 1026, the load balancer 422 releases the local memory block back to the local memory pool. At step 1028, the load balancer 422 updates the cell in the LMEM block index table corresponding to the local memory block to indicate that the local memory block is no longer assigned. The method 1000 then terminates.

In sum, various techniques are disclosed for partitioning execution and memory resources in a parallel processing system for executing cooperative thread arrays (CTAs) corresponding to tasks. In particular, execution resources in the form of texture processing clusters (TPCs) and memory resources in the form of local memory blocks are assigned to various subcontexts executing within a single context. Each subcontext maintains a separate virtual address space and separate state data, but share scheduling and context switching resources.

In a first technique, TPCs and local memory blocks are statically assigned to subcontexts. With this first technique, each subcontext is constrained to execute CTAs on particular TPCs and to assign particular local memory blocks in local memory. In a second technique, TPCs and local memory blocks are dynamically assigned to subcontexts. With this second technique, each subcontext may execute CTAs on any of the TPCs and to assign any local memory blocks in local memory, subject to a maximum credit count for the given subcontext. In a third technique, the characteristics of static and dynamic resource allocation are combined in a hybrid approach. With this third technique, each subcontext is constrained to execute on a specified subset of the total number of TPCs. Within the specified subset of TPCs, the subcontext may execute CTAs on any of the TPCs included in the subset of TPCs and to assign any local memory blocks in local memory corresponding to that same subset of TPCs, subject to a maximum credit count for the given subcontext.

At least one advantage of the disclosed techniques is that execution and local memory resources are flexibly and efficiently assigned to subcontexts corresponding to multiple processes within a parallel processing system. As a result, the utilization of the execution and local memory resources is increased relative to prior approaches. Another advantage of the disclosed techniques is that the maximum amount of execution and local memory resources that can be allocated or assigned to one subcontext is selectable and can be limited to allow more subcontexts to execute simultaneously, within the constraints of the number of available TPCs and local memory blocks. Another advantage of the disclosed techniques is that that all subcontexts execute within a single context, but maintain separate virtual address spaces and separate state data. As a result, TPCs can quickly switch from executing a CTA for one subcontext to executing a CTA for another different subcontext without the need for a full context switch.

Yet another advantage of the disclosed techniques is that execution and local memory resources are assigned to different subcontexts corresponding to different CPU processes executing on a server machine operating in a data center or a cloud computing environment that provides scalable computing resources as a service over a network. Various services provided by the server machine may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

1. In some embodiments, a computer-implemented method for allocating execution resources to groups of threads within a graphics processing unit comprises: receiving an indication from a process that a first group of threads is to be launched; determining that a first subcontext associated with the process has at least one processor credit; identifying a first processor included in a plurality of processors that has a processing load that is less than or equal to the processor loads associated with all other processors included in the plurality of processors; and launching the first group of threads to execute on the first processor.

2. The computer-implemented method of clause 1, wherein the first subcontext is included in a plurality of subcontexts, and each subcontext included in the plurality of subcontexts is associated with a different process and a different virtual address space.

3. The computer-implemented method of clause 1 or clause 2, wherein the first subcontext is included in a plurality of subcontexts, and each subcontext included in the plurality of subcontexts is associated with different state data.

4. The computer-implemented method of any of clauses 1-3, wherein the first subcontext is included in a plurality of subcontexts; the first subcontext is associated a first virtual address space; a second subcontext included in the plurality of subcontexts is associated with the first virtual address space; and a third subcontext included in the plurality of subcontexts is associated with a second virtual address space that is different from the first virtual address space.

5. The computer-implemented method of any of clauses 1-4, further comprising, in response to launching the first group of threads to execute on the first processor, decrementing a credit counter associated with the first subcontext.

6. The computer-implemented method of any of clauses 1-5, further comprising: determining that the first group of threads has completed execution on the first processor; and incrementing the credit counter associated with the first subcontext.

7. The computer-implemented method of any of clauses 1-6, wherein identifying a first processor included in the plurality of processors comprises: determining a count of available execution slots for each processor included in the plurality of processors; identifying one or more processors included in the plurality of processors that have a highest count of available execution slots; and selecting the first processor from among the one or more processors.

8. The computer-implemented method of any of clauses 1-7, further comprising determining that the first subcontext is not exclusive with respect to any subcontext associated with a second group of threads currently executing on the first processor.

9. The computer-implemented method of any of clauses 1-8, further comprising: retrieving a first record associated with the first subcontext from a first table; and determining, from the first record, that each processor included in the plurality of processors is available with respect to executing at least one group of threads associated with the first subcontext.

10. The computer-implemented method of any of clauses 1-9, wherein the first table is initialized by an operating system or a hypervisor prior to launching any group of threads to execute on any processor included in the plurality of processors.

11. The computer-implemented method of any of clauses 1-10, further comprising retrieving a second record associated with the first subcontext from a second table, wherein the second record specifies a different virtual processor identifier for each processor included in the plurality of processors that is available with respect to executing at least one group of threads associated with the first subcontext; and identifying, from the second record, a virtual processor identifier for the first processor; wherein the first processor performs a memory address calculation based on the virtual processor identifier.

12. In some embodiments, a parallel processing system comprises: a scheduler that transmits a plurality of tasks to a computer work distributor; and a compute work distributor that: selects a task included in the plurality of tasks corresponding to a process from a task list associated with a first subcontext, identifies a first thread group associated with the task is to be launched, determines that the first subcontext has at least one processor credit, identifies a first processor included in a plurality of processors that has a processing load that is less than or equal to the processor loads associated with all other processors included in the plurality of processors, and launches the first group of threads to execute on the first processor.

13. The parallel processing system of clause 12, wherein the compute work distributor further determines that the first processor is available to execute the first group of threads.

14. The parallel processing system of clause 12 or clause 13, wherein the compute work distributor further, in response to launching the first group of threads to execute on the first processor, decrements a credit counter associated with the first subcontext.

15. The parallel processing system of any of clauses 12-14, wherein the compute work distributor further: determines that the first group of threads has completed execution on the first processor; and increments the credit counter associated with the first subcontext.

16. The parallel processing system of any of clauses 12-15, wherein identifying a first processor included in the plurality of processors comprises: determining a count of available execution slots for each processor included in the plurality of processors; identifying one or more processors included in the plurality of processors that have a highest count of available execution slots; and selecting the first processor from among the one or more processors.

17. The parallel processing system of any of clauses 12-16, wherein the compute work distributor further: generates a launch packet for the first processor that includes the first group of threads; and transmits the launch packet to the first processor.

18. The parallel processing system of any of clauses 12-17, wherein the launch packet further includes a number corresponding to the first subcontext.

19. The parallel processing system of any of clauses 12-18, wherein the parallel processing system is associated with a server machine included within a data center.

20. In some embodiments, a computer-implemented method for allocating execution resources to groups of threads within a graphics processing unit comprises: receiving an indication from a process that a first group of threads is to be launched, wherein the first subcontext is included in a plurality of subcontexts, and each subcontext included in the plurality of subcontexts is associated with a different process and a different virtual address space; determining whether the first subcontext has at least one processor credit; and if the first subcontext has at least one processor credit, then: identifying a first processor included in a plurality of processors that has a processing load that is less than or equal to the processor loads associated with all other processors included in the plurality of processors, and launching the first group of threads to execute on the first processor; or if the first subcontext does not have at least one processor credit, then: identifying a subset of processors included in the plurality of processors already assigned to the first subcontext, identifying a second processor included in the subset of processors that has a processing load that is less than or equal to the processor loads associated with all other processors included in the subset of processors; and launching the first group of threads on the second processor.

21. In some embodiments, a computer-implemented method for assigning local memory to thread groups within a graphics processing unit comprises: receiving an indication that a first thread group associated with a first subcontext has been assigned to execute on a first processor; identifying a first record in a local memory block assignment table corresponding to the first subcontext; identifying a first local memory block that is currently not assigned; and storing a first value in the first record indicating that the first local memory block is assigned to the first subcontext and the first processor.

22. The computer-implemented method of clause 21, further comprising storing a first index to the first local memory block in the first record.

23. The computer-implemented method of clause 21 or clause 22, further comprising: receiving an indication that a second thread group associated with the first subcontext has been assigned to execute on a second processor; identifying the first record in the local memory block assignment table corresponding to the first subcontext; identifying a second local memory block that is currently not assigned; storing a second value in the first record indicating that the second local memory block is assigned to the first subcontext and the second processor; and storing a second index to the second local memory block in the first record, wherein the second index is greater than the first index.

24. The computer-implemented method of any of clauses 21-23, wherein: the first processor and the second processor are included in a processing cluster; and the first local memory block is accessible by both the first processor and the second processor.

25. The computer-implemented method of any of clauses 21-24, wherein the first processor and the second processor are included in a plurality of processors, and the local memory block assignment table is initialized by an operating system or a hypervisor prior to launching any group of threads to execute on any processor included in the plurality of processors.

26. The computer-implemented method of any of clauses 21-25, further comprising: retrieving the first index to the first local memory block from the first record; and associating the first local memory block with the first index.

27. The computer-implemented method of any of clauses 21-26, further comprising transmitting a message to the first processor that includes the first index to the first local memory block.

28. The computer-implemented method of any of clauses 21-27, further comprising: determining that the first thread group has completed execution on the first processor; and storing a new value in the first record indicating that first local memory block is not assigned to the first subcontext.

29. The computer-implemented method of any of clauses 21-28, further comprising: receiving an indication that a second thread group associated with a second subcontext has been assigned to execute on a second processor; identifying a second record in the local memory block assignment table corresponding to the second subcontext and the second processor; and determining that a memory block has already been assigned to the second subcontext.

30. The computer-implemented method of any of clauses 21-29, wherein with first thread group is launched to execute on the first processor prior to storing the value in the first record indicating that first local memory block is assigned to the first subcontext.

31. In some embodiments, a parallel processing system comprises: a scheduler that transmits a plurality of tasks to a computer work distributor; and a compute work distributor that: selects a task corresponding to a process from a task list associated with a first subcontext, identifies a first thread group associated with the first subcontext that has been assigned to execute on a first processor, determines that the first subcontext has at least one processor credit, identifies a first record in a local memory block assignment table corresponding to the first subcontext, identifies a first local memory block that is currently not assigned, and stores a first value in the first record indicating that the first local memory block is assigned to the first subcontext and the first processor.

32. The parallel processing system of clause 31, wherein the compute work distributor further stores a first index to the first local memory block in the first record.

33. The parallel processing system of clause 31 or clause 32, wherein the compute work distributor further: identifies a second thread group associated with the first subcontext that has been assigned to execute on a second processor; identifies the first record in the local memory block assignment table corresponding to the first subcontext; identifies a second local memory block that is currently not assigned; stores a second value in the first record indicating that the second local memory block is assigned to the first subcontext and the second processor; and stores a second index to the second local memory block in the first record, wherein the second index is greater than the first index.

34. The parallel processing system of any of clauses 31-33, wherein: the first processor and the second processor are included in a processing cluster; and the first local memory block is accessible by both the first processor and the second processor.

35. The parallel processing system of any of clauses 31-34, wherein the first processor and the second processor are included in a plurality of processors, and the local memory block assignment table is initialized by an operating system or a hypervisor prior to launching any group of threads to execute on any processor included in the plurality of processors.

36. The parallel processing system of any of clauses 31-35, wherein the compute work distributor further: retrieves the first index to the first local memory block from the first record; and associates the first local memory block with the first index.

37. The parallel processing system of any of clauses 31-36, wherein the first processor accesses the first local memory block via a virtual address space associated with the first subcontext.

38. The parallel processing system of any of clauses 31-37, wherein the compute work distributor further: generates a launch packet for the first processor that includes a page directory base address associated with the virtual address space; and transmits the launch packet to the first processor.

39. The parallel processing system of any of clauses 31-38, wherein the launch packet further includes local memory assignment information related to the first local memory block.

40. In some embodiments, a computer-implemented method for assigning local memory to thread groups within a graphics processing unit comprises: receiving an indication that a first thread group associated with a first subcontext has been assigned to execute on a first processor; identifying a first record in a local memory block assignment table corresponding to the first subcontext; determining whether local memory blocks included in a plurality local memory blocks are statically assigned; and if the local memory blocks included in the plurality local memory blocks are statically assigned, then retrieving a first index associated with a first local memory block from the first record, or if the local memory blocks included in the plurality local memory blocks are not statically assigned, then identifying a second local memory block that is currently not assigned; and storing a storing a second index associated with the second local memory block in the first record.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for allocating execution resources to groups of threads within a graphics processing unit, the method comprising:
   receiving an indication from a process that a first group of threads associated with a first subcontext is to be launched;
   determining, based on a credit counter count, whether at least one processor credit remains from a first number of processor credits initially allocated to the first subcontext, wherein the first number of processor credits indicates a maximum number of processors on which the first subcontext can be processed simultaneously, and wherein the credit counter count is initially set to the first number of processor credits and is decremented each time a group of threads associated with the first subcontext is launched for execution on a processor that is not already assigned to the first subcontext;
   if at least one processor credit remains, then:
      identifying a first processor included in a plurality of processors that has a processing load that is less than or equal to processing loads associated with all other processors included in the plurality of processors, and
      launching the first group of threads to execute on the first processor, or
   if no processor credits remain, then:
      identifying a second processor included in a subset of processors already assigned to the first subcontext, wherein the second processor has a processing load that is less than or equal to processing loads associated with all other processors included in the subset of processors, and
      launching the first group of threads to execute on the second processor.

2. The computer-implemented method of claim 1, wherein the first subcontext is included in a plurality of subcontexts, and each subcontext included in the plurality of subcontexts is associated with a different process and a different virtual address space.

3. The computer-implemented method of claim 1, wherein the first subcontext is included in a plurality of subcontexts, and each subcontext included in the plurality of subcontexts is associated with different state data.

4. The computer-implemented method of claim 1, wherein:
   the first subcontext is included in a plurality of subcontexts;

the first subcontext is associated with a first virtual address space;
a second subcontext included in the plurality of subcontexts is associated with the first virtual address space; and
a third subcontext included in the plurality of subcontexts is associated with a second virtual address space that is different from the first virtual address space.

5. The computer-implemented method of claim 1, further comprising, in response to launching the first group of threads to execute on the first processor, decrementing the credit counter count associated with the first subcontext.

6. The computer-implemented method of claim 5, further comprising:
determining that the first group of threads has completed execution on the first processor; and
incrementing the credit counter count associated with the first subcontext.

7. The computer-implemented method of claim 1, wherein identifying a first processor included in the plurality of processors comprises:
determining a count of available execution slots for each processor included in the plurality of processors;
identifying one or more processors included in the plurality of processors that have a highest count of available execution slots; and
selecting the first processor from among the one or more processors.

8. The computer-implemented method of claim 1, further comprising determining that the first subcontext is not exclusive with respect to any subcontext associated with a second group of threads currently executing on the first processor.

9. The computer-implemented method of claim 1, further comprising:
retrieving a first record associated with the first subcontext from a first table; and
determining, from the first record, that each processor included in the plurality of processors is available with respect to executing at least one group of threads associated with the first subcontext.

10. The computer-implemented method of claim 9, wherein the first table is initialized by an operating system or a hypervisor prior to launching any group of threads to execute on any processor included in the plurality of processors.

11. The computer-implemented method of claim 9, further comprising:
retrieving a second record associated with the first subcontext from a second table, wherein the second record specifies a different virtual processor identifier for each processor included in the plurality of processors that is available with respect to executing at least one group of threads associated with the first subcontext; and
identifying, from the second record, a virtual processor identifier for the first processor;
wherein the first processor performs a memory address calculation based on the virtual processor identifier.

12. A parallel processing system, comprising:
a memory that includes instructions; and
a parallel processor that is coupled to the memory and executes the instructions, wherein the parallel processor includes:
a scheduler that transmits a plurality of tasks to a compute work distributor; and
the compute work distributor that:
selects a task included in the plurality of tasks corresponding to a process from a task list associated with a first subcontext,
identifies a first group of threads associated with the task is to be launched,
determines, based on a credit counter count, whether at least one processor credit remains from a first number of processor credits initially allocated to the first subcontext, wherein the first number of processor credits indicates a maximum number of processors on which the first subcontext can be processed simultaneously, and wherein the credit counter count is initially set to the first number of processor credits and is decremented each time a group of threads associated with the first subcontext is launched for execution on a processor that is not already assigned to the first subcontext,
if at least one processor credit remains, then the compute work distributor:
identifies a first processor included in a plurality of processors that has a processing load that is less than or equal to processing loads associated with all other processors included in the plurality of processors, and
launches the first group of threads to execute on the first processor, or
if no processor credits remain, then the compute work distributor:
identifies a second processor included in a subset of processors already assigned to the first subcontext, wherein the second processor has a processing load that is less than or equal to processing loads associated with all other processors included in the subset of processors, and
launches the first group of threads to execute on the second processor.

13. The parallel processing system of claim 12, wherein the compute work distributor further determines that the first processor is available to execute the first group of threads.

14. The parallel processing system of claim 12, wherein the compute work distributor further, in response to launching the first group of threads to execute on the first processor, decrements the credit counter count associated with the first subcontext.

15. The parallel processing system of claim 14, wherein the compute work distributor further:
determines that the first group of threads has completed execution on the first processor; and
increments the credit counter count associated with the first subcontext.

16. The parallel processing system of claim 12, wherein identifying a first processor included in the plurality of processors comprises:
determining a count of available execution slots for each processor included in the plurality of processors;
identifying one or more processors included in the plurality of processors that have a highest count of available execution slots; and
selecting the first processor from among the one or more processors.

17. The parallel processing system of claim 12, wherein the compute work distributor further:
generates a launch packet for the first processor that includes the first group of threads; and
transmits the launch packet to the first processor.

18. The parallel processing system of claim 17, wherein the launch packet further includes a number corresponding to the first subcontext.

19. The parallel processing system of claim 17, wherein the parallel processing system is associated with a server machine included within a data center.

20. A computer-implemented method for allocating execution resources to groups of threads within a graphics processing unit, the method comprising:
receiving an indication from a process that a first group of threads associated with a first subcontext is to be launched, wherein the first subcontext is included in a plurality of subcontexts, and each subcontext included in the plurality of subcontexts is associated with a different process and a different virtual address space;
determining, based on a credit counter count, whether at least one processor credit remains from a first number of processor credits initially allocated to the first subcontext, wherein the first number of processor credits indicates a maximum number of processors on which the first subcontext can be processed simultaneously, and wherein the credit counter count is initially set to the first number of processor credits and is decremented each time a group of threads associated with the first subcontext is launched for execution on a processor that is not already assigned to the first subcontext; and
if at least one processor credit remains from the first number of processor credits initially allocated to the first subcontext, then:
identifying a first processor included in a plurality of processors that has a processing load that is less than or equal to processing loads associated with all other processors included in the plurality of processors, and
launching the first group of threads to execute on the first processor; or
if no processor credits remain from the first number of processor credits initially allocated to the first subcontext, then:
identifying a subset of processors included in the plurality of processors already assigned to the first subcontext,
identifying a second processor included in the subset of processors that has a processing load that is less than or equal to processing loads associated with all other processors included in the subset of processors; and
launching the first group of threads on the second processor.

\* \* \* \* \*